US009976079B2

(12) United States Patent
Otsuka et al.

(10) Patent No.: US 9,976,079 B2
(45) Date of Patent: May 22, 2018

(54) ORGANIC-INORGANIC COMPOSITE, ORGANIC-INORGANIC COMPOSITE COMPOSITION AND INK

(75) Inventors: Takeshi Otsuka, Tokyo (JP); Yoshiki Chujo, Kyoto (JP)

(73) Assignees: SUMITOMO OSAKA CEMENT CO., LTD., Tokyo (JP); KYOTO UNIVERSITY, Kyoto (JP)

(*) Notice: Subject to any disclaimer, the term of this patent is extended or adjusted under 35 U.S.C. 154(b) by 0 days. days.

(21) Appl. No.: 13/979,754

(22) PCT Filed: Jan. 18, 2012

(86) PCT No.: PCT/JP2012/050984
§ 371 (c)(1),
(2), (4) Date: Aug. 26, 2013

(87) PCT Pub. No.: WO2012/099177
PCT Pub. Date: Jul. 26, 2012

(65) Prior Publication Data
US 2013/0331506 A1 Dec. 12, 2013

(30) Foreign Application Priority Data
Jan. 19, 2011 (JP) ................. 2011-008705

(51) Int. Cl.
C09K 11/07 (2006.01)
C09K 11/06 (2006.01)
C09K 11/08 (2006.01)
C09K 11/02 (2006.01)
C09D 11/101 (2014.01)
(Continued)

(52) U.S. Cl.
CPC ........... C09K 11/07 (2013.01); C09D 11/101 (2013.01); C09K 11/02 (2013.01); C09K 11/025 (2013.01); C09K 11/06 (2013.01); C08K 5/0091 (2013.01); C08L 33/14 (2013.01); C09K 2211/1029 (2013.01); C09K 2211/183 (2013.01)

(58) Field of Classification Search
USPC ......................................................... 524/430
See application file for complete search history.

(56) References Cited

U.S. PATENT DOCUMENTS 6,599,631 B2 * 7/2003 Kambe ................... B32B 27/08
428/364
2004/0265253 A1 * 12/2004 Seo ....................... C03C 14/008
424/63

FOREIGN PATENT DOCUMENTS

EP 1607446 12/2005
JP A-61-167644 7/1986
JP A-09-241628 9/1997
(Continued)

OTHER PUBLICATIONS

International Search Report for corresponding International Patent Application No. PCT/JP2012/050984 (dated Apr. 17, 2012).
(Continued)

*Primary Examiner* — Ling Siu Choi
*Assistant Examiner* — Thuy-Ai N Nguyen
(74) *Attorney, Agent, or Firm* — Merchant & Gould P.C.

(57) ABSTRACT

Provided is an organic-inorganic composite having two or more kinds of light emission sites. When the organic-inorganic composite is caused to emit light, each of emission colors in each of light emission sites is independently maintained as a emission color that is shown when each of the light emission sites is independently caused to emit light.

17 Claims, 4 Drawing Sheets

(51) Int. Cl.
*C08K 5/00* (2006.01)
*C08L 33/14* (2006.01)

(56) References Cited

FOREIGN PATENT DOCUMENTS

| JP | A-11-349875 | 12/1999 |
|---|---|---|
| JP | A-2001-055568 | 2/2001 |
| JP | A-2001-163617 | 6/2001 |
| JP | A-2004-524396 | 8/2004 |
| JP | A-2005-294124 | 10/2005 |
| JP | A-2006-144002 | 6/2006 |
| JP | A-2006-321910 | 11/2006 |
| JP | A-2008-144269 | 6/2008 |
| JP | A-2009-528400 | 8/2009 |
| WO | WO 2002/058928 A1 | 8/2002 |
| WO | WO 2004/081072 A2 | 9/2004 |
| WO | WO 2004/085543 A1 | 10/2004 |
| WO | WO 2007/096892 | 8/2007 |
| WO | WO 2011/096321 A1 | 8/2011 |

OTHER PUBLICATIONS

Takayama et al. "Synthesis of $Alq_3$-pendent Soluble Polymers and Their Application to Organic Light Emitting Diode," *Kobunshi Ronbunshu*, (63)10: 696-703 (2006).

Ivanovici et al. "Atom Transfer Radical Polymerization of Complexes Based on Ti and Zr Alkoxides Modified with β-Keto Ester Ligands and Transformation of the Resulting Polymers in Nanocomposites," *Macromolecules*, (41)4: 1131-1139 (2008).

Otsuka et al. "Highly stabilized luminescent polymer nanocomposites: Fluorescence emission from metal quinolate complexes with inorganic nanocrystals," *J. of Materials Chem.*, (20)47: 10688-10695 (2010).

Office Action for Japanese Patent Application No. 2012-553759 (dated Apr. 7, 2015).

* cited by examiner

ORGANIC-INORGANIC COMPOSITE, ORGANIC-INORGANIC COMPOSITE COMPOSITION AND INK

This application is a U.S. National Stage Application under 35 U.S.C. § 371 of International Patent Application No. PCT/JP2012/050984 filed 18 Jan. 2012, which claims the benefit of priority to Japanese Patent Application No. 2011-008705 filed 19 Jan. 2011, the disclosures of all of which are hereby incorporated by reference in their entireties. The International Application was published in Japanese on 26 Jul. 2012 as WO 2012/099177.

TECHNICAL FIELD

The present invention relates to an organic-inorganic composite, an organic-inorganic composite composition, and an ink.

BACKGROUND

In recent years, light emitting devices or displays using light emitting elements made of organic materials have been actively developed. Among these, an organic electroluminescence (EL) device in which alight emitting layer made of an organic thin film, a hole transport layer, and an electron transport layer are laminated is a carrier injection-type self-light emitting device. The organic EL device is a promising display since a high luminance is obtained from this device.

As electron transporting materials or light emitting materials for the organic EL device, metal complexes having organic ligands (hereinafter, abbreviated to organometallic complexes) are being used. For example, if tris(8-hydroxyquinolinato)aluminum ($Alq_3$) as an alumiquinolinium complex is vacuum-deposited between a hole transport layer and a cathode made of aluminum, the organic EL element can be prepared, and therefore, $Alq_3$ is being used as an organometallic complex material having excellent electron transporting properties and light emitting properties.

Currently, as a method for forming a organometallic complex film, a dry process by vacuum deposition is mainly used. However, in view of simplicity of the production process, achievement of a large area, or the like, a wet process using polymer materials is also being examined (for example, see Non-Patent Literature 1).

In addition, in view of stabilizing organic EL characteristics, various organic-inorganic hybrid materials obtained by protecting organic light emitting materials with inorganic oxides such as silica have been proposed.

When a sol-gel method is used for synthesizing these organic-inorganic hybrid materials, light emitting hybrid materials synthesized at a relatively low temperature are obtained (for example, see Patent Literature 1).

In these organic-inorganic hybrid materials, a π-conjugated polymer can be evenly dispersed in an inorganic matrix. Based on this property, white-light emitting materials having excellent weather resistance have been proposed (for example, see Patent Literature 2).

Moreover, an organic-inorganic hybrid material containing an organic ligand, which is not easily prepared by the conventional sol-gel method, has been proposed by using metal oxides instead of inorganic oxides such as silica (for example, see Patent Literature 3).

Meanwhile, regarding a case where excellent light emitting efficiency is focused on, a luminescence hybrid material, which is obtained by combining clay mineral with a dye, or an electroluminescent element has been proposed (for example, see Patent Literature 4 and 5).

As described above, various light emitting materials have been examined so far. Particularly, light emitting hybrid materials having both the light emitting characteristics and weather resistance have been examined by using an organic material and an inorganic material in combination, and various proposals have been provided.

PRIOR ART DOCUMENTS

Patent Literature

Patent Literature 1: Japanese Unexamined Patent Application Publication No. 2006-144002
Patent Literature 2: Japanese Unexamined Patent Application Publication No. 2006-321910
Patent Literature 3: Pamphlet of International Publication No. WO2004/085543
Patent Literature 4: Japanese Unexamined Patent Application Publication No. 2001-55568
Patent Literature 5: PCT Japanese Translation Patent Publication No. 2009-528400

Non Patent Literature

Non-Patent Literature 1: Toshio TAKAYAMA, Masatoshi KITAMURA, Yasushi KOBAYASHI, Yasuhiko ARAKAWA, Kazuaki KUDO, "Synthesis of soluble polymers having $Alq_3$-type side chain and application of the polymers to organic EL element", Polymer Proceedings, The Society of Polymer Science, published in October 2006, Vol. 63, No. 10, pp 696-703

SUMMARY OF INVENTION

Problems to be Solved by the Invention

Incidentally, the material itself of the light emitting material using the conventional organic polymer materials is an organic compound, and accordingly, there is a problem that thermal stability thereof is insufficient even if the material is made into a polymer. In addition, with an organic-inorganic hybrid material in which a π-conjugated polymer is evenly dispersed in an inorganic matrix, it is difficult to form a high-molecular weight substance of the π-conjugated polymer. Moreover, since the π-conjugated polymer itself has a very rigid molecular structure, sometimes film formability becomes poor. Furthermore, with such a light emitting material, it is difficult to adjust the emission color by combining plural π-conjugated polymers. That is, there is a problem that even if the π-conjugated polymers are combined, energy shift or the like from a polymer having a high energy gap to a polymer having a low energy gap occurs due to the π-π interaction, and this makes it difficult to adjust the emission color.

In addition, in the case of an organometallic complex in which a metal complex is formed on a polymer side chain, since a metal alkoxide is used for introducing a metal element, the metal alkoxide is likely to deteriorate due to moisture in the atmosphere or the like. Accordingly, there is a problem that it is difficult to treat the complex by a simple process.

Moreover, in the organic-inorganic hybrid material having light emitting properties, the inorganic components are fundamentally formed into a network and in a solid state, so the organic-inorganic hybrid material itself lacks flexibility. Accordingly, there is a problem that it is difficult to obtain a flexible film.

In the organic-inorganic hybrid material in which π-conjugated polymers are evenly dispersed in an inorganic matrix, it is difficult to evenly disperse the π-conjugated polymers in the inorganic matrix. Consequently, there is a problem that a step of synthesizing the organic-inorganic hybrid material is extremely complicated, and the production cost thereof is also high. There is also a problem that even in this material, energy shift between polymer chains occurs due to the π-π interaction, so compounding of components needs to be tried in various ways to obtain a desired emission color.

Meanwhile, in an organic-inorganic hybrid material containing an organic ligand, though the organic ligand is stabilized by an inorganic component, an organic component is not chemically bonded to an inorganic material. Accordingly, problems such as discoloration caused by deterioration of the organic ligand arise in some cases. There is also a problem that energy shift resulting from different types of organic ligands is easily caused by mixing of plural light emitting groups, and a desired emission color cannot be obtained.

In addition, a complex has been proposed in which the energy shift is inhibited by using an interlayer of clay mineral so as to obtain light emitted from a polymer or light emitted solely from a dye. However, sometimes an interlayer-peeling material of the clay mineral negatively affects a light emission site. Moreover, there is also a problem that clay minerals are stacked on each other during film formation, and this makes it difficult to handle the complex. There is also a problem that it is impossible to reflect the effect of an inorganic component that can improve light emitting characteristics since the clay mineral is not directly involved in light emission.

Meanwhile, an ink containing fluorescent materials is used as an ink for printing or an ink jet ink. If an organometallic complex is used as a light emitting material for such an ink, durability becomes insufficient, and this leads to a problem that inhibition of deterioration becomes difficult. There is also a problem that concentration quenching (a phenomenon in which an emission intensity does not increase or decreases in proportion to concentration of a light emitting material when the concentration of a light emitting material is high) occurs due to the aggregation of the organometallic complex. In addition, when a light emitting substance formed of an inorganic oxide is used as a light emitting material, the inorganic oxide is aggregated since it disperses poorly, and stability of the ink is likely to be impaired.

The present invention has been made to solve the above problems. That is, the present invention aims to provide an organic-inorganic composite and an organic-inorganic composite composition in which a complex is formed with respect to metal atoms on the surface of a metal oxide particles and which enables each emission color to independently maintain its own color even if plural types of the complexes are mixed with each other, and to provide an ink containing the organic-inorganic composite composition.

Means for Solving the Problem

Regarding an organic-inorganic composite in which plural emission colors are mixed with each other, the present inventors repeated thorough research, and as a result, they found the following and completed the present invention.

That is, the present inventors found that if a light emission site is formed in a manner in which an organic ligand of an organic polymer compound forms a complex with metal atoms existing on the surface of a metal oxide particles, the metal oxide particles can be chemically bonded to the organic polymer compound having the organic ligand; if a structure in which a light emission site is interposed between the metal oxide particles and the organic polymer compound is formed, light emitting characteristics can be improved; and if energy shift of light emission between the respective light emission sites can be inhibited, each of emission colors can be maintained independently.

That is, an organic-inorganic composite of the present invention is an organic-inorganic composite having two or more kinds of light emission sites, in which when the organic-inorganic composite is caused to emit light, each of emission colors (light emission wavelengths) in each of light emission sites is independently maintained as a emission color that is shown when each of the light emission sites is independently caused to emit light.

It is preferable that the organic-inorganic composite contains metal oxide particles and an organic polymer compound having a polymer chain and an organic ligand which is bonded to the polymer chain through a covalent bond, and the organic polymer compound is bonded to the metal oxide particles in a manner in which the organic ligand forms a complex with metal atoms existing on the surface of the metal oxide particles.

It is preferable that the organic-inorganic composite preferably include at least two or more kinds of organic-inorganic composites having different emission colors.

It is preferable that the organic polymer compound preferably form an inorganic dispersed phase by being cross-linked by the metal oxide particles.

It is preferable that the light emission site be a complex formed of the organic ligand and the metal atoms.

The organic-inorganic composite composition of the present invention contains metal oxide particles and (i) an organic polymer compound having an organic ligand which is bonded to a polymer chain thereof through a covalent bond and has an ability to form a coordinate bond with metal atoms on the surface of the metal oxide particles or (ii) a monomer or oligomer forming the organic polymer compound having the organic ligand. The monomer or oligomer forming the organic polymer compound having the organic ligand refers to a monomer or an oligomer that can form the organic polymer compound having the organic ligand.

An ink of the present invention is characterized in that the ink contains the organic-inorganic composite composition of the present invention and an organic solvent.

The organic-inorganic composite may substantially consist of the metal oxide particles and the organic polymer compound.

A method for producing an organic-inorganic composite of the present invention includes a first step of obtaining an organic-inorganic composite composition by mixing metal oxide particles with (i) an organic polymer compound having an organic ligand which is bonded to a polymer chain thereof through a covalent bond and has an ability to form a coordinate bond with metal atoms on the surface of the metal oxide particles or (ii) a monomer or oligomer forming the organic polymer compound having the organic ligand, and a second step of obtaining the organic-inorganic composite of the present invention by curing the obtained organic-inorganic composite composition.

Effects of Invention

The organic-inorganic composite of the present invention is an organic-inorganic composite having two or more kinds of light emission sites. When the organic-inorganic composite is caused to emit light, each of emission colors in each of light emission sites of the composite can be independently maintained similar to an emission color that is shown when each of light emission sites is provided independently and is caused to emit light. Accordingly, it is possible to independently maintain the emission color in each light emission site at a desired emission intensity, without causing the colors to interfere with each other. Consequently, by adjusting the emission colors (light emission wavelengths) in the respective light emission sites and a mixing ratio between the respective light emission sites, a desired emission color can be easily provided.

Moreover, in the present invention, it is preferable that the organic ligand of the organic polymer compound be bonded to the metal oxide particles by forming a complex with metal atoms on the surface of the metal oxide particles to form a light emission site. Accordingly, the metal oxide particles can be chemically bonded to the organic polymer compound having the organic ligand. It is more preferable that the present invention have a structure in which the light emission site is in a position interposed between the metal oxide particles and the organic polymer compound. In this manner, improvement of light emission characteristics such as stabilization of emission intensity or light emission wavelength can be realized, energy shift of light emission can be inhibited, and accordingly, each emission color can be independently maintained. As a result, since the organic-inorganic composite has plural light emission sites, a desired emission color can be easily provided.

In the present invention, it is preferable that the organic ligand of the organic polymer compound be bonded to a polymer chain of the organic polymer compound through a covalent bond. It is more preferable that the organic ligand be bonded to a polymer main chain of the organic polymer compound. This organic ligand is bonded to the metal oxide particles by forming a complex with metal atoms on the surface of the metal oxide particles. Accordingly, the organic ligand is stabilized, light emission characteristics can be improved, and discoloration caused by deterioration of the organic ligand can be diminished.

In addition, in the present invention, it is preferable to use metal oxide particles and form an inorganic dispersed phase by evenly dispersing the metal oxide particles in an organic polymer compound. If such a constitution is employed, a homogeneous organic-inorganic composite having a high degree of transparency and excellent light emission characteristics is obtained. Furthermore, mechanical characteristics such as hardness and strength can be improved further in the organic-inorganic composite, compared to a case where only an organic polymer compound is used. In addition, flexibility and moldability of the organic polymer compound can be maintained, and consequently, an organic-inorganic composite having a flexible film shape can be easily obtained.

The organic polymer compound may not be a π-conjugated polymer. Since a π-conjugated polymer is not necessarily used, the production process is not complicated, and the production cost will not increase.

Moreover, since clay mineral is not necessarily used, defect in film formation that is caused by the influence of stacking of clay minerals, deterioration of light emission sites that is caused by an interlayer-peeling material, and the like will not occur.

In addition, due to the structure in which the light emission site is interposed between the metal oxide particles and the organic polymer compound, energy shift of light emission can be inhibited. Therefore, variation of the emission color, concentration quenching, and the like resulting from energy shift to different kinds of organic ligands in interlayers that is caused when clay mineral used will not occur. Moreover, a metal alkoxide does not need to be used for the organic polymer compound.

The organic-inorganic composite composition of the present invention contains metal oxide particles and (i) an organic polymer compound having an organic ligand which is bonded to a polymer chain thereof through a covalent bond and has an ability to form a coordinate bond with metal atoms on the surface of the metal oxide particles or (ii) a monomer or an oligomer which can form an organic polymer compound which has the organic ligand. Accordingly, light emission characteristics and transparency of the obtained organic-inorganic composite can be improved.

In addition, when the organic-inorganic composite composition contains metal oxide particles and an organic polymer compound having an organic ligand which is bonded to a polymer chain thereof through a covalent bond and has an ability to form a coordinate bond with metal atoms on the surface of the metal oxide particles, it is possible to inhibit the concentration quenching and variation of the emission color that is caused by the aggregation of organic ligands. Furthermore, the metal oxide particles are bonded to the polymer chain through a covalent bond. Consequently, the metal oxide particles can disperse reliably, a homogeneous composition having excellent optical characteristics can be formed, and stabilized light emission can be conducted.

The organic polymer compound of the organic-inorganic composite composition does not contain a metal alkoxide. Accordingly, the composition can be dried or heated in the ordinary atmosphere.

Therefore, the organic-inorganic composite of the present invention can be easily prepared from the organic-inorganic composite composition by using a conventional simple production device.

The ink of the present invention contains the organic-inorganic composite composition of the present invention and an organic solvent. Accordingly, if the ink is printed by a printing machine or ejected by an ink jet, an organic-inorganic composite having a desired shape can be easily prepared.

BEST MODE FOR CARRYING OUT THE INVENTION

The present invention relates to an organic-inorganic composite, an organic-inorganic composite composition, and an ink. More specifically, the present invention related to an organic-inorganic composite and an organic-inorganic composite composition which maintain light emission characteristics and transparency by forming a complex by using metal atoms on the surface of metal oxide particles and can separate the respective emission colors from each other when two or more kinds of emission colors are mixed with each other and maintain the emission colors as they are, and an ink containing the organic-inorganic composite composition.

Examples preferable for embodying the organic-inorganic composite, organic-inorganic composite composition, and ink of the present invention will be described below.

The following examples are detailed description for promoting understanding of the main point of the present invention, and unless otherwise specified, they do not limit the present invention. Within a range that does not depart from the main point of the present invention, omission, substitution, and the like can be made, and amount, ratio, and other factors can also be changed.

[Organic-Inorganic Composite]

First, FIG. 1 will be described.

Figure 1:
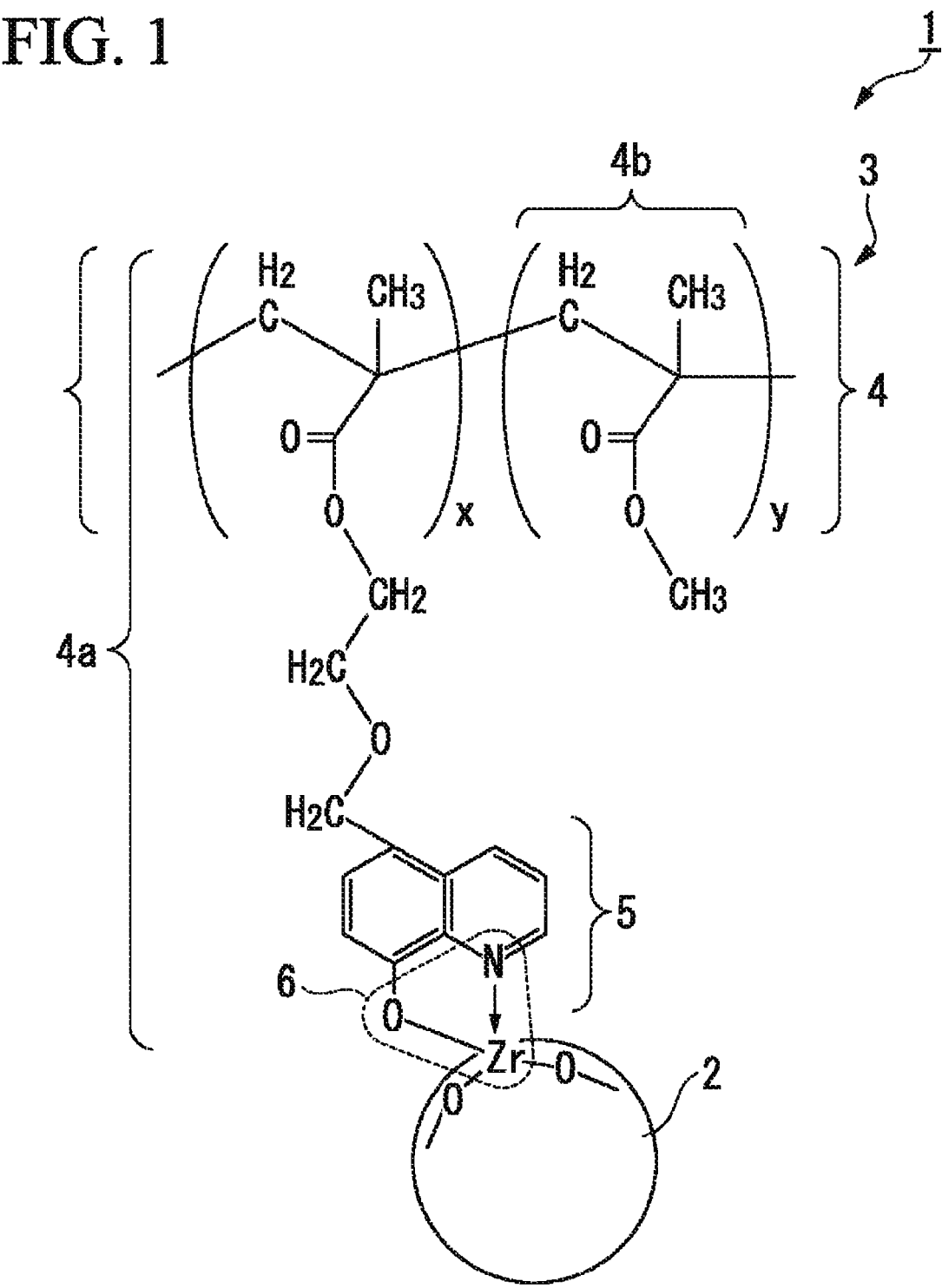
FIG. 1 is a schematic view showing an embodiment of an organic-inorganic composite of the present invention.

FIG. 1 is a schematic view showing an organic-inorganic composite as a basic constitution of the present invention. FIG. 1 exemplifies a case where zirconium oxide particles are used as metal oxide particles, 8-quinolinol is used as an organic ligand having an ability to form a coordinate bond with metal atoms on the surface of the metal oxide particles, and a polymethyl methacrylate copolymer is used as an organic polymer compound. In addition, a case of using metal oxide particles other than zirconium oxide particles, a case of using an organic ligand other than 8-quinolinol, or a case of using an organic polymer compound other than a polymethyl methacrylate copolymer is the same as the above example in terms of the principle.

An organic-inorganic composite 1 is constituted with metal oxide particles 2 and an organic polymer compound 3. An organic ligand 5 is bonded to a polymer chain 4 (polymer main chain) of the organic polymer compound 3 through a covalent bond. The organic ligand 5 forms a complex 6 with metal atoms on the surface of the metal oxide particles 2. In this manner, a light emission site is formed, and a complex is formed by a bond between the organic ligand 5 and the metal oxide particles 2.

The polymer chain 4 can be selected arbitrarily. However, it is preferable that the polymer chain 4 be a copolymer containing a portion 4a having an organic ligand-containing monomer as a structural unit and a portion 4b having a vinyl-based monomer as a structural unit. Any number can be selected for x and y in FIG. 1, and a ratio thereof may also be arbitrarily selected, as long as the object can be achieved.

In the organic-inorganic composite 1, the organic ligand 5 which has an ability to form a coordinate bond with metal atoms on the surface of the metal oxide particles does not exist as a single ligand not forming a polymer. The organic ligand 5 is bonded to the polymer chain 4 through a covalent bond. In addition, the organic ligand 5 is strongly bonded to metal atoms on the surface of the metal oxide particles 2, that is, to Zr in zirconium oxide by a coordinate bond in this basic constitution, and forms a complex 6 with Zr. For convenience, the organic ligand and the metal oxide particles bonded to each other, a light emitting portion therebetween, a combination of the organic ligands, the organic ligand binding portion of the organic ligand in the metal oxide particles, and a metal that are bonded to one another, or only the portion of a coordinate bond of the organic ligand may be called the complex 6 or a complex respectively in some cases. Accordingly, in this basic structure of the present invention, the polymer chain 4, the organic ligand 5, and the metal oxide particles 2 are integrated by being bonded to one another.

By this structure, the organic-inorganic composite 1 has the following effects.

First, light emission efficiency can be heightened, and light emission characteristics can be stabilized. The reason is as follows.

Generally, a skeleton in an organic molecule (including a carbon skeleton and a skeleton in which a hetero atom is present) has a high degree of three-dimensional freedom. Accordingly, the skeleton is easily deformed (thermal vibration motion) when being supplied with energy from the outside. Likewise, in a complex formed by an organic ligand, the skeleton of the organic ligand is deformed easily, and a coordinate bond itself practically does not exert an effect of inhibiting the deformation of skeleton. Accordingly, the entire complex can be easily deformed.

When the complex or a portion of the complex becomes a light emission site, in order to cause it to emit light, it is necessary to cause energy level transition of electrons inside the complex or charge-transfer transition (hereinafter, called transition for light emission) by supplying energy from the outside. However, when the complex or a portion of the complex is easily deformed, much of the energy supplied from the outside is consumed for deformation (thermal vibration motion) of the complex or a portion of the complex, and this makes it difficult to cause the transition for light emission. Accordingly, problems that light is unstably emitted, light emission efficiency decreases, or an absorption wavelength or a light emission wavelength changes arise.

Even in the case of the complex 6 of this basic structure, if the complex is formed in a state where the organic ligand 5 is present independently without being bonded to a polymer, the complex may be deformed in the same manner as above. However, in the organic-inorganic composite 1 of the this basic structure, the polymer chain 4, the organic ligand 5, and the metal oxide particles 2 are integrated by being bonded to one another, and both sides of the complex 6 as a light emission site are interposed between the polymer chain 4 having a large mass and the metal oxide particles 2. Accordingly, in this basic structure, a degree of freedom of the deformation of the complex 6 decreases greatly, and the complex is stabilized by being fixed to a specific three-dimensional shape. Since the shape of the complex 6 is stabilized in this way, the energy supplied to the complex 6 from the outside is practically not consumed for deformation of the complex and is used for the transition for light emission, and accordingly, decrease in the light emission efficiency can be prevented. Moreover, since the three-dimensional shape of the complex 6 is fixed, the absorption wavelength or light emission wavelength becomes constant, and change in the absorption wavelength or unstability of light emission can be removed.

In the organic-inorganic composite 1, the organic ligand 5 and the metal oxide particles 2 as an inorganic component disperse evenly and stably in the polymer chain 4 as a matrix component, without causing phase separation from the polymer chain 4 or aggregation.

As the reason, it is considered that since the polymer chain 4, the organic ligand 5, and the metal oxide particles 2 are in a state of being integrated by being bonded to one another, a state where the organic ligand 5 and the metal oxide particles 2 are not be separated from or aggregated with the polymer chain 4 may be formed.

In addition, since phase separation and aggregation do not occur, separation and decomposition caused between an organic phase and an inorganic phase can be prevented. Therefore, deterioration caused over time can be inhibited, and as a result, durability can be improved.

In this manner, in the organic-inorganic composite 1 of this basic structure, the organic ligand 5 having been introduced into the organic polymer compound 3 forms a complex with the metal oxide particles 2, in a state where the organic ligand 5 has formed the complex 6 with metal atoms on the surface of the metal oxide particles 2. Consequently, the organic ligand 5 is stabilized by the polymer chain 4 and the metal oxide particles 2, and accordingly, light emission characteristics and durability can be improved.

Next, FIG. 2 will be described.

Figure 2:
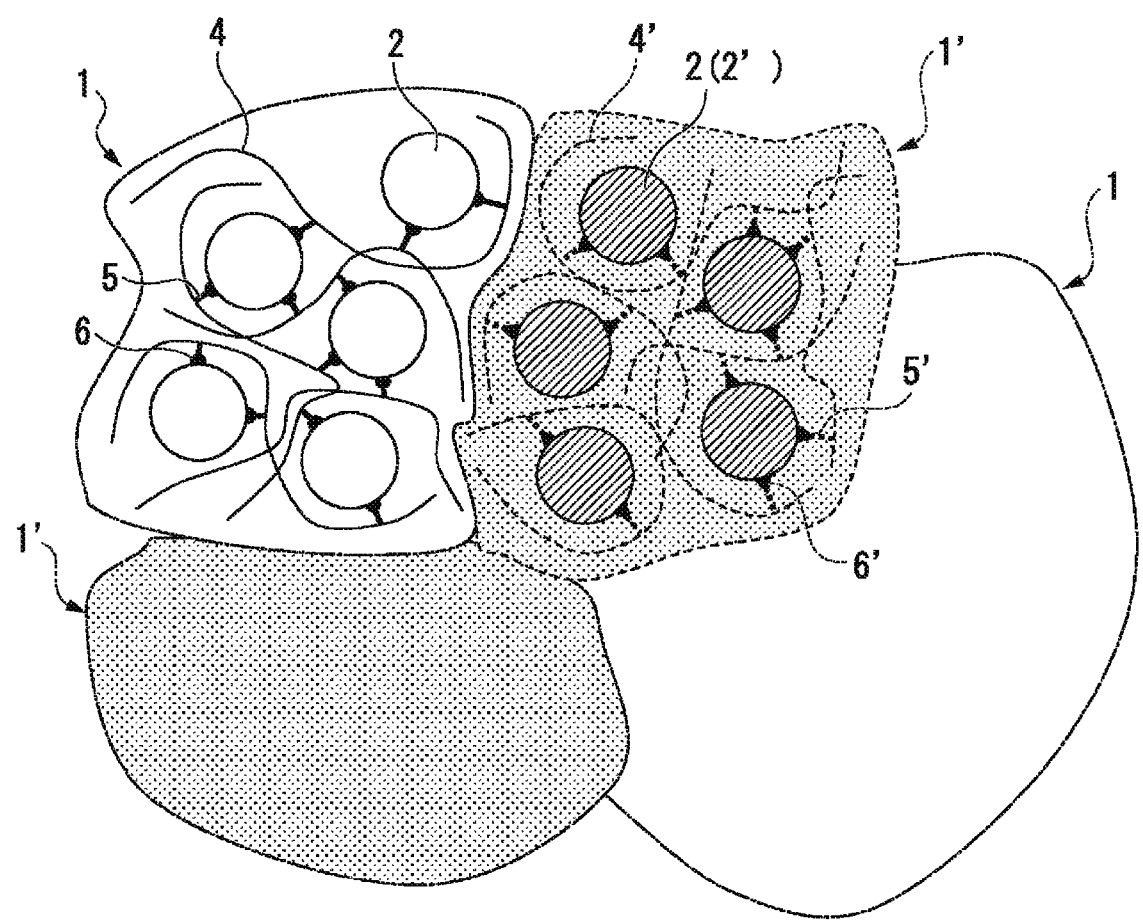
FIG. 2 is a schematic view showing a state where two kinds of an embodiment of organic-inorganic composites of the present invention are mixed with each other.

FIG. 2 is a schematic view showing an embodiment of the present invention that is an organic-inorganic composite in a state where two kinds of organic-inorganic composites are mixed with each other. In this view, the organic-inorganic composite 1 that can exhibit one emission color is mixed with an organic-inorganic composite 1' that can exhibit another emission color that is different from the above emission color. In addition, the polymer chain 4 containing the organic ligand 5 of the organic-inorganic composite 1 is bonded to the metal oxide particles 2, and a polymer chain 4' containing the organic ligand 5' of the organic-inorganic composite 1' is bonded to the metal oxide particles 2 or other metal oxide particles 2'.

In FIG. 2, the schematic view showing the internal structure of the organic-inorganic composites 1 and 1' shows only one composite, and the internal structure of the other composite is omitted.

In the organic-inorganic composite 1, plural organic ligands 5 have been introduced into the polymer chain 4, and the organic ligand 5 and metal atoms on the surface of the metal oxide particles 2 form the complex 6. On the other hand, in the organic-inorganic composite 1' that can exhibit another emission color, the polymer chain 4' containing the organic ligand 5' and metal atoms on the surface of the metal oxide particles 2 or the other metal oxide particles 2' form a complex 6'.

These complexes 6 and 6' are separated from each other with maintaining an interval equal to or longer than a single-nanometer order, and accordingly, energy shift between the organic-inorganic composites 1 and 1' can be inhibited. As a result, each of the emission of light can independently maintain its color, and light emission characteristics can be stabilized.

Figure 3:
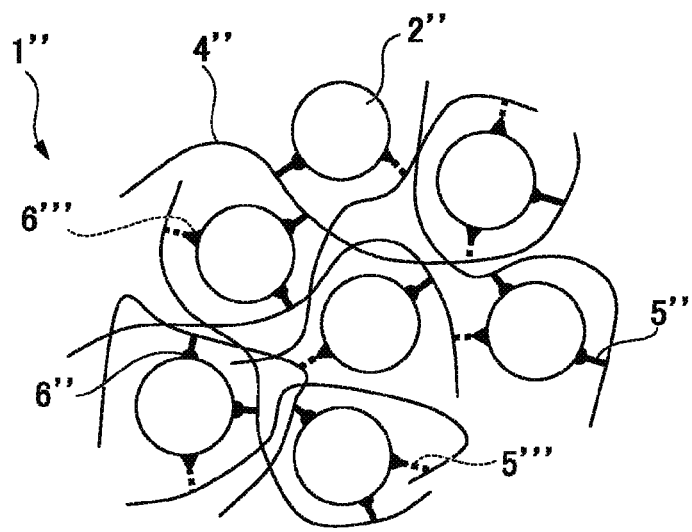
FIG. 3 is a schematic view showing an embodiment of an organic-inorganic composite of the present invention wherein the composite having two kinds of organic ligands that can exhibit the emission color.

FIG. 3 will be described.

FIG. 3 shows another embodiment of the present invention. Specifically, this is a schematic view showing an organic-inorganic composite containing two kinds of organic ligands that can exhibit different emission colors. A polymer chain 4" of an organic-inorganic composite 1" contains an organic ligand 5" which can exhibit one emission color by forming a complex with a metal element and an organic ligand 5''' that can exhibit another emission color. The polymer chain 4" is bonded to metal oxide particles 2".

In the organic-inorganic composite 1", the organic ligands 5" and 5''' having been introduced into the polymer chain 4" form complexes 6" and 6''' respectively with metal atoms on the surface of the metal oxide particles 2". Each of the organic ligands 5" and 5''' can exhibit one emission color and the other emission color.

These complexes 6" and 6''' are fixed by the polymer chain 4" and the metal oxide particles 2" and separated from each other with maintaining an interval equal to or longer than a single-nanometer order. Accordingly, energy shift between the complexes 6" and 6''' can be inhibited. As a result, each of the emission colors can be maintain as it is, and light emission characteristics can be stabilized.

As described above, according to the organic-inorganic composite of the present invention, the organic-inorganic composite 1 having the basic structure shown in FIG. 1 can be provided. The organic-inorganic composite 1 may contain the metal oxide particles 2 and the organic polymer compound 3 having the organic ligand 5 bonded to the polymer chain 4, which has the organic ligand-containing monomer 4a and the vinyl-based monomer 4b, through a covalent bond. In addition, the organic ligand 5 forms the complex 6 with metal atoms of the metal oxide particles 2 at the surface of the particles, whereby the organic polymer compound 3 is bonded to the metal oxide particles 2.

Moreover, according to the organic-inorganic composite of the present invention, the organic-inorganic composites 1' and 1" having plural kinds of light emission sites as shown in FIGS. 2 and 3 can be provided. The emission color in each of the complexes 1' and 1" can be maintained independently. The organic-inorganic composite of the present invention may be a composite substance or a mixture of plural kinds of organic-inorganic composites having different emission colors.

Next, components and the like preferably used for the organic-inorganic composite of the present invention will be described in detail.

The metal oxide particles can be selected arbitrarily as long as they can form an organic-inorganic composite. The metal oxide particles are preferably particles of a metal oxide or a composite metal oxide or particles containing these as components. One kind of the particles may be used, or two or more kinds thereof may be used in combination. Examples of the metal oxide include one or two or more kinds selected from a group consisting of magnesium oxide, calcium oxide, strontium oxide, barium oxide, scandium oxide, yttrium oxide, lanthanum oxide, titanium oxide, zirconium oxide, hafnium oxide, zinc oxide, aluminum oxide, gallium oxide, indium oxide, iron oxide, copper oxide, niobium oxide, tungsten oxide, lead oxide, bismuth oxide, cerium oxide, and antimony oxide.

In addition, examples of the composite metal oxide include one or two or more kinds selected from a group consisting of antimony-added tin oxide (ATO), tin-added indium oxide (ITO), zinc-added indium oxide (IZO), aluminum-added zinc oxide (AZO), and gallium-added zinc oxide (GZO).

An average particle diameter of these metal oxide particles can be selected arbitrarily, but is preferably from 1 nm to 100 nm, and more preferably from 2 nm to 50 nm.

Herein, the reason why the average particle diameter of metal oxide particles is preferably limited within a range of from 1 nm to 100 nm is as follows. That is, if the average particle diameter is less than 1 nm, the particle diameter is too small, so the structure of the metal oxide particles becomes unstable. As a result, light emission characteristics in the organic-inorganic composite may change, and a problem that an excellent organic-inorganic composite is not easily obtained since the particles poorly disperse in an organic solvent may arise. On the other hand, if the average particle diameter exceeds 100 nm, the metal oxide particles are too large, so light scattering occurs. As a result, light permeability and light emission strength may be reduced.

The content of the metal oxide particles in the organic-inorganic composite can be selected arbitrarily, but is preferably from 1% by mass to 50% by mass, and more preferably from 5% by mass to 20% by mass.

Herein, the reason why the content of the metal oxide particles is limited within a range of, for example, from 1% by mass to 50% by mass is that the metal oxide particles can be in an excellent dispersion state in this range. That is, if the content of the metal oxide particles is less than 1% by mass, light emission characteristics of the organic-inorganic composite may deteriorate. Moreover, if the content exceeds 50% by mass, this is not preferable since gelation or aggregation with precipitation may occur, and the organic-inorganic composite may lose its characteristic of being a homogeneous composite.

The organic polymer compound containing the organic ligand bonded to the polymer chain through a covalent bond can be selected arbitrarily. However, the organic polymer compound is preferably a copolymer of a vinyl-based monomer and an organic ligand-containing monomer containing an unsaturated group and the organic ligand having an ability to form a coordinate bond with the metal atoms within the molecule thereof. In addition, in the present invention, the organic polymer may be understood in a general meaning and refers to a polymer that contains at least carbon and/or is not constituted only with inorganic elements.

The organic ligand forms a complex with metal atoms on the surface of the metal oxide particles, and can be selected arbitrarily as long as the complex forms a light emission site. However, the organic ligand is preferably an organic ligand having a cyclic structure which is a conjugated type or has plural unsaturated bonds, wherein the ligand contains an element having a lone electron pair and a hydroxyl group in the same ligand, and can form a cyclic complex in a manner in which electrons of the lone electron pair and oxygen atoms of the hydroxyl group are coordinated with the same metal atom. Here, the organic compound having not yet been bonded to the polymer chain and a group formed from the organic compound after the organic compound is bonded to the polymer chain may be described using the term "organic ligand" in some cases. Herein, the element having a lone electron pair can be arbitrarily selected without particular limitation. However, as the element, elements that may be generally contained in the organic compound, such as nitrogen, oxygen, and sulfur, are preferable. The elements having a lone electron pair may form, for example, a heterocyclic ring by existing as a heteroatom in the cyclic structure of the organic ligand, or may exist near the cyclic structure, that is, outside the cyclic structure, just like oxygen of a carbonyl group bonded to the cyclic structure.

Specifically, as the organic ligand, it is preferable to use, for example, one of (1) an organic compound which contains a phenolic hydroxyl group and a heterocyclic ring having a nitrogen atom as a heteroatom and can form a complex by using the hydroxyl group and nitrogen, (2) an organic compound which contains a phenolic hydroxyl group and a carbonyl group and can form a complex by using these, and (3) an organic compound which has a β-diketone structure and can form a complex by using this.

Examples of the (1) organic compound which can form a complex by using a phenolic hydroxyl group and a heterocyclic ring having a nitrogen atom as a heteroatom include 8-hydroxyquinoline and derivatives thereof. Examples of organic compounds other than these include 10-hydroxybenzo[h]-quinoline, 2-(2-hydroxyphenyl)benzoxazole, 2-(2-hydroxyphenyl)benzothiazole, a 2-(2-hydroxyphenyl)benzimidazole derivative, 2-(2-hydroxyphenyl)pyridine and derivatives thereof, and the like. Moreover, compounds based on quinoxaline, phenazine, naphthyridine, and the like are also usable.

Examples of the (2) organic compound which can form a complex by using a phenolic hydroxyl group and a carbonyl group include 3-hydroxyflavone, 5-hydroxyflavone, and the like. Moreover, compounds based on acetophenone, benzophenone, and the like are also usable.

Examples of the (3) organic compound which can form a complex by using a β-diketone structure include 1,3-diphenyl-1,3-propanedione, 1,3-bis(4-methoxyphenyl)-1,3-propanedione, and the like.

The β-diketone structure is a structure represented by the following Formula (1). This structure seems not to have a hydroxyl group. However, actually, the structure is constantly changing (vibrating) within the molecule as shown in the following chemical formula, and a hydroxyl group and oxygen atoms having a lone electron pair are present in the structure.

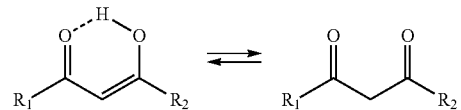

In the organic-inorganic composite of the present invention, it is preferable that electrons of the lone electron pair in the organic ligand and oxygen atoms of the hydroxyl group form a cyclic complex by being coordinated with the same metal atoms in the metal oxide particles. The reason is considered to be as below.

It is known that some complexes emit light by causing charge-transfer transition (CT transition) accompanying transfer of electrons between different atoms. In the present invention, when the organic ligand has a conjugated system or plural unsaturated bonds, the conjugated system or the portion of plural unsaturated bonds that the organic ligand has becomes rich in electrons in the cyclic complex structure formed by the organic ligand, whereby a state where the electrons can easily move to the central metal from the organic ligand is created.

If the above state is taken into consideration, it is considered that the complex of the present invention emits light by causing Ligand to Metal Charge Transfer (LMCT) transition, which is a transition process in which electrons move to the central metal from the organic ligand, by absorbing energy of light and the like from the outside. The above cyclic complex is preferable as a structure for causing light emission by LMCT transition.

In addition, a light emission wavelength can be controlled by selecting the structure and component of these organic ligands, the metal element in the metal oxide to be coordinated, the structure of the complex itself, and the like. The light emission wavelength is not particularly limited, but for example, in order to emit light in the region of visible ray, a peak of a light emission spectrum is preferably positioned in a wavelength region of from 380 nm to 750 nm.

As the energy from the outside, heat, electricity, and the like can be selected in addition to light. However, it is preferable to emit light by supplying light energy, that is, irradiating the complex with excitation light.

The organic-inorganic composite of the present invention is characterized by having two or more kinds of light emission sites. Accordingly, when the light emission sites are formed by the complex as described above, it is preferable to select components which form the complex, that is, it is preferable to select the organic ligand and metal atoms on the surface of the metal oxide particles such that the combination thereof corresponds to the number of the kinds of the target light emission site. The combination is not particularly limited, and examples thereof include a combination of one kind of metal atom and plural kinds of organic ligands, a combination of plural kinds of metal atoms and one kind of organic ligand, a combination of these two kinds of combinations, and the like. It is preferable to cause plural peaks to appear in a light emission spectrum by using the combination as above. Moreover, it is particularly preferable that even after plural emission colors are mixed with each other, light of low-wavelength side (light with high energy) is kept being emitted such that plural emission colors are maintained respectively.

A method for introducing these plural kinds of combinations of the organic ligand and metal atoms on the surface of the metal oxide particles into the organic-inorganic composite of the present invention can be arbitrarily selected. For example, as shown in FIG. 2, plural kinds of organic-inorganic composites may be mixed with each other, or as shown in FIG. 3, a method of bonding plural kinds of organic ligands to the polymer chain may be used. In addition, if composite metal oxide particles are used as the metal oxide particles, plural kinds of metal atoms are present on the surface of one oxide particle. Consequently, even if one kind of composite metal oxide particles are combined with one kind of organic ligand, plural kinds of combinations of the organic ligand and metal atoms on the surface of the metal oxide particles can be introduced into the organic-inorganic composite. Furthermore, these methods may be used in combination.

Next, the organic ligand-containing monomer will be described.

It is preferable that the organic ligand of the present invention be used by being formed into an organic ligand-containing monomer by being bonded through a covalent bond to a monomer, which has a polymerizable unsaturated group and has a three-dimensional structure not obstructing the site used for forming a complex when being bonded to the organic ligand. For example, an alkyl group is introduced into the organic ligand, and the ligand is bonded to a monomer having a polymerizable unsaturated group by an organic chemical technique using an ether bond, an ester bond, or the like, whereby an organic ligand-containing monomer can be synthesized.

In this manner, if the organic ligand is bonded to the monomer having a polymerizable unsaturated group through a covalent bond, the organic ligand is stabilized, light emission characteristics are improved, and deterioration of the organic ligand can be inhibited. In addition, the organic ligand may form a covalent bond with the monomer having a polymerizable unsaturated group, and the form or method of bonding can be arbitrarily selected without particular limitation.

The organic ligand-containing monomer to which the organic ligand is bonded through a covalent bond and which has a polymerizable unsaturated group can be arbitrarily selected. Examples thereof include monomers containing a polymerizable unsaturated group such as an acryloyl group, a methacryloyl group, a vinyl group, or a styryl group. These monomers are appropriately selected in consideration of the compatibility thereof with the metal oxide particles and the like. One kind of the monomer having a polymerizable unsaturated group may be used alone, or two or more kinds thereof may be used by being mixed with each other.

Next, the vinyl-based monomer which forms the polymer chain 4 by being copolymerized with the above organic ligand-containing monomer will be described.

The vinyl-based monomer is a monomer having a polymerizable unsaturated bond. The vinyl-based monomer can be arbitrarily selected, and examples thereof include a (meth)acryl-based monomer which contains an acryloyl group or a methacryloyl group within the molecule, a styrene-based monomer, a vinyl chloride-based monomer, an acrylamide-based monomer, a vinyl acetate-based monomer, a diene-based monomer such as butadiene or isoprene, and the like.

Particularly, since a (meth)acryl-based monomer has excellent transparency, it is preferable as a material of the organic-inorganic composite which is required to have light emission characteristics and transparency. As the (meth)acryl-based monomer, a monofunctional (meth)acryl monomer is particularly preferable, and a polyfunctional (meth)acryl monomer may be optionally used. Moreover, one kind of the (meth)acryl-based monomer may be used alone, or two or more kinds thereof may be used by being mixed with each other.

Next, specific examples of the monofunctional (meth)acrylic monomer and polyfunctional (meth)acrylic monomer will be described respectively.

(a) Aliphatic monofunctional (meth)acrylic monomer: an alkyl (meth)acrylic monomer such as a (meth)acrylic monomer, a methyl (meth)acrylic monomer, an ethyl (meth)acrylic monomer, a butyl (meth)acrylic monomer, a lauryl (meth)acrylic monomer, or a stearyl (meth)acrylic monomer; an alkoxy alkylene glycol (meth)acrylic monomer such as a methoxy propylene glycol (meth)acrylic monomer or an ethoxy diethylene glycol (meth)acrylic monomer; an N-substituted acrylamide monomer such as a (meth)acrylamide monomer or an N-butoxymethyl (meth)acrylamide monomer; or the like:

(b) Aliphatic polyfunctional (meth)acrylic monomer: an alkylene glycol di(meth)acrylic monomer such as a 1,6-hexanediol di(meth)acrylic monomer, a 1,4-butanediol di(meth)acrylic monomer, an ethylene glycol di(meth)acrylic monomer, a diethylene glycol di(meth)acrylic monomer, a triethylene glycol di(meth)acrylic monomer, a tetraethylene glycol di(meth)acrylic monomer, a tripropylene glycol di(meth)acrylic monomer, a neopentyl glycol di(meth)acrylic monomer, a polyethylene glycol di(meth)acrylic monomer, or a polybutanediol di(meth)acrylic monomer; a tri(meth)acrylic monomer such as a pentaerythritol triacrylic monomer, a trimethylolpropane tri(meth)acrylic monomer, or ethylene oxide, or a propylene oxide-modified trimethylolpropane triacrylic monomer; a tetra(meth)acrylic monomer such as a pentaerythritol tetraacrylic monomer or a ditrimethylolpropane tetraacrylic monomer; a penta(meth)acrylic monomer such as a dipentaerythritol(monohydroxy)pentaacrylic monomer; or the like:

(c) Alicyclic (meth)acrylic monomer: monofunctional type; a cyclohexyl (meth)acrylic monomer and the like: polyfunctional type; a dicyclopentadienyl di(meth)acrylic monomer and the like:

(d) Aromatic (meth)acrylic monomer: monofunctional type; a phenyl (meth)acrylic monomer, a benzyl (meth)acrylic monomer, a phenoxyethyl (meth)acrylic monomer, a phenoxy diethylene glycol (meth)acrylic monomer, and the like: polyfunctional type; diacrylic monomers such as a bisphenol A di(meth)acrylic monomer, a bisphenol F di(meth)acrylic monomer, and the like:

(e) Polyurethane (meth)acrylic monomer: a polyurethane ether (meth)acrylic monomer, a polyester (meth)acrylic monomer, and the like:

(f) Epoxy (meth)acrylic monomer: a bisphenol A-type epoxy acrylic monomer, a novolac-type epoxy acrylic monomer, and the like.

These vinyl-based monomers are used together with the organic ligand-containing monomer. The vinyl-based monomers become copolymers by being copolymerized preferably using a polymerization initiator, and forms the organic polymer compound of the present embodiment.

The ratio of the organic ligand-containing monomer to all monomers can be arbitrarily selected, but is preferably from 0.01 mol % to 15 mol %, and more preferably from 0.03 mol % to 1 mol %.

The reason why the ratio of the organic ligand-containing monomer to all monomers is preferably limited within a range of from 0.01 mol % to 15 mol % is as follows. That is, if the ratio is less than 0.01 mol %, the amount of the organic ligand is too small, and accordingly, light emission characteristics may deteriorate. On the other hand, if the ratio exceeds 15 mol %, the amount of the organic ligand is too large, and accordingly, an organic polymer compound lack moldability or processability, and a film may not be formed.

The polymerization initiator can be appropriately selected and used, as long as it uses a chemical reaction that is generally used. In addition, a photoinitiator or the like that initiates polymerization of a monomer by generating radical by using heat, light (such as ultraviolet rays), or the like may also be used.

Moreover, using gamma ($\gamma$) rays or an electron beam to initiate the polymerization of the monomer is useful for forming the organic polymer compound since a polymerization initiator is not required.

Examples of the polymerization initiator include a peroxide-based polymerization initiator such as lauroyl peroxide, benzoyl peroxide, di-t-butyl peroxide, t-butyl peroxy-2-ethylhexanoate, t-butyl peroxyisobutyrate, t-butyl peroxypivalate, t-butyl peroxybenzoate or t-butyl peroxyacetate, or an azo-based polymerization initiator such as 2,2'-azobisisobutyronitrile.

Examples of the photoinitiator include acetophenone, 1-(4-isopropylphenyl)-2-hydroxy-2-methylpropan-1-one, 2-hydroxy-2-methyl-1-phenylpropan-1-one, 2,2-dimethoxy-2-phenylacetophenone, 2-methyl-[4-(methylthio)phenyl]-2-morpholino-1-propanone, 1,4-dibenzoylbenzene, 1,2-diphenylethanedione, 1-hydroxycyclohexyl phenyl ketone, benzophenone, and the like.

The amount of the polymerization initiator mixed in can be arbitrarily selected, but is preferably from 0.1% by to 5% by mass based on the total amount of the organic ligand-containing monomer and the vinyl-based monomer.

[Organic-Inorganic Composite Composition]

The organic-inorganic composite composition of the present embodiment is a composition containing metal oxide particles and (i) an organic polymer compound (hereinafter, also called an "organic ligand-containing organic polymer compound) having an organic ligand which is bonded to a polymer chain thereof through a covalent bond and has an ability to form a coordinate bond with metal atoms on the surface of the metal oxide particles, or (ii) a monomer or oligomer which can form the organic polymer compound having the organic ligand.

The organic-inorganic composite composition may further contain an organic solvent.

Preferable examples of the organic-inorganic composite composition containing metal oxide particles, an organic ligand-containing organic polymer compound, and an organic solvent will be described.

It is preferable to select the number of kinds of the metal oxide particles and organic ligand-containing organic polymer compound that are contained in the organic-inorganic composite composition of the present invention such that the number of combinations of metal atoms on the surface of the metal oxide particles and the organic ligand in the organic ligand-containing organic polymer compound becomes the number of emission colors of an organic-inorganic composite obtained by curing the organic-inorganic composite composition.

The organic-inorganic composite composition of the present example described below contains two kinds of combinations of metal atoms and organic ligands. Specifically, the composition is in a state where (A) and (B) are mixed. That is, (A) a combination having a structure, in which first metal oxide particles having first metal atoms on the surface thereof and a first organic ligand-containing organic polymer compound having a first organic ligand are dispersed and/or dissolved in an organic solvent, and the first organic ligand in the first organic ligand-containing organic polymer compound forms a complex with the first metal atoms on the surface of the first metal oxide particles so as to be bonded to the first metal atoms such that a first emission color can be exhibited, is mixed with (B) a combination having a structure, in which second metal oxide particles having second metal atoms on the surface thereof and a second organic ligand-containing organic polymer compound having a second organic ligand are dispersed and/or dissolved in an organic solvent, and the second organic ligand in the second organic ligand-containing organic polymer compound forms a complex with the second metal atoms on the surface of the second metal oxide particles so as to be bonded to the second metal atoms such that a second emission color can be exhibited.

The first and second metal oxide particles (first and second metal atoms) may be the same as each other, as long as the first and second organic ligand-containing organic polymer compounds (first and second organic ligands) are different from each other. Inversely, the first and second organic ligand-containing organic polymer compounds (first and second organic ligands) may be the same as each other, as long as the first and second metal oxide particles (first and second metal atoms) are different from each other.

Moreover, in the present invention, the mixed combinations of the metal oxide particles and organic ligand-containing organic polymer compounds are not limited to two kinds, and may be three, four, or more kinds of combinations of metal oxide particles and organic ligand-containing organic polymer compounds. In addition, if metal composite oxide particles are used as the metal oxide particles, plural kinds of metal atoms are present on the surface of one oxide particle. Accordingly, in such a case, one kind of composite metal oxide particles may be combined with one kind of organic ligand-containing organic polymer compound.

Further, in the following description, if the term such as "first" or "second" is not marked for a component, this indicates the component as a whole.

The organic solvent can be arbitrarily selected as long as it is a solvent in which the metal oxide particles can disperse and the organic ligand-containing organic polymer compound can dissolve. As the solvent, for example, alcohols such as methanol, ethanol, 2-propanol, butanol, and octanol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol mono ethyl ether, ketones such as acetone, methyl ethyl ketone, methyl isobutyl ketone, acetylacetone, and cyclohexanone, aromatic hydrocarbons such as benzene, toluene, xylene, and ethylbenzene, amides such as dimethyl formamide, N,N-dimethylacetamide, and N-methylpyrrolidone are preferably used. One kind among these solvents may be used alone, or two or more kinds thereof may be used by being mixed with each other.

In order to disperse the metal oxide particles in the organic solvent, it is necessary for the surface of the metal oxide particles to be lyophilic to the organic solvent. Therefore, it is preferable to perform surface treatment to make the surface lyophilic.

The type of a surface treating agent used for the surface treatment can be appropriately selected according to the type of the metal oxide particles and organic solvent. Particularly, the surface treating agents are preferable which can be easily substituted with an organic ligand so that the organic ligand is coordinated with metal atoms on the surface of the metal oxide when the organic ligand (including the organic ligand in the organic ligand-containing organic polymer compound) exists, and can be easily removed after the organic-inorganic composite is formed. For example, an organic acid such as carboxylic acid that is weakly bonded to the metal oxide particles is particularly preferable.

As means for dispersing the metal oxide particles in the organic solvent, for example, a bead mill using zirconia beads, a ball mill, and the like may be preferably used. The time required for the dispersion treatment may be the time sufficient for the metal oxide particles to undergo surface treatment by using the surface treating agent, which is generally 1 to 6 hours. In this manner, the metal oxide particles become surface-treated metal oxide particles of which the surface has been treated with the surface treating agent.

The organic ligand-containing organic polymer compound is preferably a copolymer that is obtained by adding a polymerization initiator to a solution containing the organic ligand-containing monomer of which the organic ligand is bonded to a monomer having a polymerizable unsaturated group through a covalent bond and the vinyl-based monomer and performing a polymerization reaction.

The method for causing a polymerization reaction can be arbitrarily selected, and examples thereof include a heating method and a solution polymerization method using a radical polymerization reaction initiated by light irradiation. Examples of the radical polymerization reaction include a polymerization reaction by heat (thermal polymerization), a polymerization reaction by light such as ultraviolet rays (photopolymerization), a polymerization reaction by gamma rays, a method as a combination of these plural methods, and the like.

For example, in order to obtain the organic-inorganic composite composition of the present invention of the above example, first, a polymerization initiator is added to a solution obtained by dissolving the first organic ligand-containing monomer and the vinyl-based monomer in an organic solvent so as to cause a polymerization reaction. In the solution obtained after polymerization, a copolymer containing the first organic ligand is formed. From the solution, unnecessary components such as the organic solvent or unreacted materials are separated or removed by using an evaporator, a separator or the like, whereby the first organic ligand-containing organic polymer compound can be obtained.

Thereafter, the first organic ligand-containing organic polymer compound is introduced into a dispersion obtained by dispersing the first surface-treated metal oxide particles in an organic solvent, and the solution is optionally heated and/or stirred to dissolve the first organic ligand-containing organic polymer compound in the organic solvent (mixing step). In this process, the organic ligand forms a complex with metal atoms in the metal oxide particles, whereby the first organic ligand-containing organic polymer compound is bonded to the first metal oxide particle. Moreover, at this time, the surface treating agent on the surface of the first surface-treated metal oxide particles is dissociated from the surface of the metal oxide particles by performing ligand exchange or the like with the organic ligand. At this time, the dissociated surface treating agent remains in the organic solvent. The remaining surface treating agent can be easily removed by heating, pressure reduction, an extraction operation, and the like performed in the following process of preparing an organic-inorganic composite.

In this manner, the organic ligand in the first organic ligand-containing organic polymer compound forms a complex with the first metal atom on the surface of the first metal oxide particle so as to be bonded to the first metal atom, whereby a composition that can exhibit a first emission color can be obtained.

In addition, if there are no problems, the organic ligand-containing organic polymer compound may be dissolved in an organic solvent in advance, and then the metal oxide particles may be dispersed to obtain the composition.

Separately from the above process, the organic ligand in the second organic ligand-containing organic polymer compound forms a complex with metal atom on the surface of the second metal oxide particle so as to be bonded to the metal atom, in the same manner as above, except that the first organic ligand-containing monomer and the first surface-treated metal oxide particle as raw materials are changed to the second organic ligand-containing monomer and the second surface-treated metal oxide particle, whereby a composition that can exhibit a second emission color can be obtained.

Subsequently, the composition that can exhibit the first emission color and the composition that can exhibit the emission color are mixed with each other at an optionally selected ratio. In this manner, an organic-inorganic composite composition adjusted to have target emission colors is prepared.

At this time, the metal oxide particles, organic ligand-containing organic polymer, and organic solvent to be used are not limited and can be prepared according to the purpose.

In this manner, the organic-inorganic composite composition of the present embodiment can be obtained.

Next, an example of preparing the organic-inorganic composite of the present embodiment by using the organic-inorganic composite composition containing an organic solvent will be described.

Herein, a case where the organic-inorganic composite of the present invention is a film-shaped product and a bulk-form product will be described.

In the case of the film-shaped product, the organic-inorganic composite composition is coated onto a substrate by a coating method that is arbitrarily selected, such as a screen printing method, an offset printing method, a spin coating method, or a roll coating method, thereby obtaining a coated film (coating step).

In addition, in the case of the bulk-form product, the organic-inorganic composite composition is molded using a method which is optionally selected, for example, using a mold, thereby obtaining a molded product (molding step). Alternatively, after a portion or most of the solvent may be removed from the composition, the composition may be filled in a mold or a container to obtain a molded product by using a potting method.

After the film-shape product or molded product is obtained, the organic solvent is removed from the film-shaped product or molded product (organic solvent removing step). A portion or most of the organic solvent may be removed at the same time with the formation of the film-shaped product or molded product. That is, the forming step and the organic solvent removing step may be performed simultaneously. Any method can be employed as the method for removing the organic solvent as long as the film-shaped product or molded product is not deformed or altered. Particularly, a method of performing heating in the atmosphere or under reduced pressure is preferable. As the heating method, infrared ray irradiation or the like can be used as well as a general heater.

By removing the organic solvent in this manner, the organic-inorganic composite as the film-shaped product or bulk-form product that is the present embodiment can be obtained. That is, the organic-inorganic composite having a solid shape can be obtained. In addition, the shape or form of the organic-inorganic composite may be arbitrarily selected according to the use thereof or how to use it.

The organic-inorganic composite obtained in the manner described in the this example is typically in the form in which the organic-inorganic composite 1 that can exhibit the first emission color is mixed with the organic-inorganic composite 1' that can exhibit the second emission color, as shown in FIG. 2.

In addition, a heating treatment or an irradiation treatment using ultraviolet rays, gamma rays, electron beams or the like may be performed on the obtained organic-inorganic composite so as to cause copolymerization of the organic ligand-containing polymer compound, whereby the organic-inorganic composite may be further cured.

The organic-inorganic composite having undergone copolymerization in this manner does not easily dissolve even in the organic solvent used for the organic-inorganic composite composition. In addition, since the organic-inorganic composite that can exhibit the first emission color and the organic-inorganic composite that can exhibit the second emission color are bonded to each other, it is possible to obtain a more stabilized organic-inorganic composite.

Next, an example of an organic-inorganic composite composition which contains metal oxide particles and a monomer or oligomer for forming an organic polymer compound having an organic ligand and does not contain an organic solvent will be described.

The organic-inorganic composite composition may further contain an organic solvent.

In the following description, the term "monomer or oligomer" may be described as "monomer (oligomer)".

It is preferable to select the number of kinds of the metal oxide particles, monomer, or oligomer contained in the organic-inorganic composite composition of the present invention such that the number of combinations of the metal atoms on the surface of the metal oxide particles and the organic ligand contained in the monomer or oligomer becomes the number of emission colors of the organic-inorganic composite that is obtained by curing the organic-inorganic composite composition.

The organic-inorganic composite composition of this example described below contains two kinds of combinations of metal atoms and organic ligands. That is, the organic-inorganic composite composition contains one kind of metal oxide particles, two kinds of organic ligand-containing monomers (oligomers), and one kind of vinyl-based monomer.

More specifically, the organic-inorganic composite composition of this example contains at least first metal oxide particles having first metal atoms on the surface thereof; a first organic ligand-containing monomer (oligomer) containing a first organic ligand which is for forming an organic ligand-containing organic polymer compound and is bonded to a monomer having a polymerizable unsaturated group through a covalent bond; a second organic ligand-containing monomer (oligomer) containing a second organic ligand which is bonded to a monomer having a polymerizable unsaturated group through a covalent bond; and a vinyl-based monomer (oligomer).

Herein, if at least one of the first organic ligand-containing monomer (oligomer), the second organic ligand-containing monomer (oligomer), and the vinyl-based monomer (oligomer) is in a liquid state, this can be used as a solvent (dispersion medium). Accordingly, an organic solvent may not be used, or the amount of an organic solvent can be reduced.

In this example, the composition contains both the metal oxide particles and organic ligand-containing monomer (oligomer). Therefore, in some cases, the organic ligand-containing monomer (oligomer) itself brings about an effect of a surface treating agent by being bonded to the metal oxide particles, and as a result, the metal oxide particles does not need to be subjected to the surface treatment. In this case, the surface treatment does not need to be performed on the metal oxide particles.

At this stage, an organic ligand-containing organic polymer compound has not been formed in the organic-inorganic composite composition of this example. On the other hand, the organic ligand-containing monomer (oligomer) has been bonded to metal atoms on the surface of the metal oxide particles by forming a complex of inorganic oxide particles. In this example, the first organic ligand-containing monomer (oligomer), the second organic ligand-containing monomer (oligomer), and the vinyl-based monomer (oligomer) are made into a copolymer by a polymerization reaction, and then the organic solvent is removed if the composition contains the organic solvent, whereby a solidified polymer containing metal oxide particles is obtained. The organic-inorganic composite of the present embodiment can be obtained in this manner.

In order to cause the polymerization reaction, a polymerization initiator may be optionally added, and the polymerization initiator can be arbitrarily selected. Examples of the method of causing the polymerization reaction include a heating method and a solution polymerization method using a radical polymerization reaction that is initiated by light irradiation.

The organic-inorganic composite obtained in the manner described in this example typically takes the form of including both a first organic-inorganic composite region that can exhibit a first emission color and a second organic-inorganic composite region that can exhibit a second emission color in one polymer chain, as shown in FIG. 3.

In addition, the method for obtaining an organic-inorganic composite as a film-shaped product or a bulk-form product from the organic-inorganic composite composition of this example is the same as the preferable example of the aforementioned organic-inorganic composite composition containing the metal oxide particles, organic ligand-containing organic polymer compound, and organic solvent. Therefore, the detailed description thereof is omitted.

In the organic-inorganic composite of the present invention, the organic ligand of the organic polymer compound is bonded to metal atoms on the surface of the metal oxide particles by forming a complex with the metal atoms, whereby a light emission site is formed. Accordingly, it is possible to chemically bond the metal oxide particles to the organic polymer compounds having the organic ligand.

Moreover, the organic-inorganic composite has a structure in which the light emission site is present in the position interposed between the metal oxide particles and the organic polymer compound. Due to this characteristic, improvement of light emission characteristics, such as stabilization of light emission strength or light emission wavelength, can be realized, and energy shift caused during light emission can be inhibited. Consequently, each of the emission colors can be independently maintained. As a result, even with an organic-inorganic composite which emits light of plural mixed emission colors since the composite has plural light emission sites, it is possible to easily provide a target emission color.

In the present invention, the organic-inorganic composite of the present invention can be easily obtained from the organic-inorganic composite composition, by (a) removing the organic solvent, (b) forming an organic ligand-containing organic polymer compound by causing a polymerization reaction between the organic ligand-containing monomer or oligomer and the vinyl-based monomer or oligomer, or (c) using (a) and (b) concurrently. Moreover, the organic-inorganic composite obtained from the organic-inorganic composite composition of the present invention can easily form an inorganic dispersed phase which is obtained by crosslinking the organic polymer compound by using metal oxide particles. Accordingly, an organic-inorganic composite having excellent thermal characteristics, optical characteristics, and mechanical characteristics can be obtained.

In addition, in the organic-inorganic composite, the metal oxide particles homogeneously disperse in the organic polymer compound, and accordingly, a problem such as white turbidity caused by aggregation will not arise.

Further, since the organic ligand is bonded to the polymer chain through a covalent bond, the organic ligand can be more stabilized due to the polymer effect, light emission characteristics can be improved, and discoloration caused by deterioration of the organic ligand can be diminished.

In the present invention, by using metal oxide particles as an inorganic component, a structure in which the metal oxide particles evenly disperse in an organic polymer compound can be formed, and accordingly, flexibility or moldability of the organic polymer compound can be maintained. Therefore, it is possible to easily obtain an organic-inorganic composite having a flexible film shape.

In addition, the organic polymer compound does not need to be a π-conjugated polymer. Accordingly, the production process is not complicated, and the production cost will not increase.

Moreover, since clay mineral is not used, defectiveness in film formation that is caused by the influence of stacking of clay minerals and deterioration of the light emission site that is caused by the interlayer peeling material will not occur.

In addition, since the organic-inorganic composite of the present invention has a structure in which the light emission site is interposed between the metal oxide particles and the organic polymer compound, energy shift caused during light emission can be inhibited. Accordingly, variation of the emission color, concentration quenching, or the like resulting from energy shift to different kinds of organic ligands between layers that is caused when clay mineral is used will not occur.

The organic-inorganic composite composition of the present invention contains metal oxide particles and (i) an organic polymer compound containing an organic ligand which is bonded to a polymer chain thereof through a covalent bond and has an ability to form a coordinate bond with metal atoms on the surface of the metal oxide particles, or (ii) a monomer or oligomer which is used for forming an organic polymer compound containing an organic ligand. Accordingly, light emission characteristics and transparency of an organic-inorganic composite obtained from the organic-inorganic composite composition of the present invention can be improved, and concentration quenching or variation of the emission color caused by aggregation of organic ligands can be inhibited.

Moreover, since the polymer chain containing the organic ligand is bonded to the metal oxide particles, the metal oxide particles can reliably disperse, and light emission can be stably performed.

In addition, unlike the conventional case of synthesizing a metal complex, the organic polymer compound does not contain a metal alkoxide. Accordingly, drying treatment or thermal treatment can be performed in the normal atmosphere.

Therefore, it is possible to easily prepare the organic-inorganic composite of the present invention by using a conventional simple production device.

[Ink]

The ink of the present invention is an ink containing the organic-inorganic composite composition of the present invention and an organic solvent. The ink is preferably utilized as ink for printing, ink-jet printing, or the like.

The metal oxide particles, organic polymer compound, and organic solvent contained in the ink are the same as the metal oxide particles, organic polymer compound, and organic solvent in the organic-inorganic composite composition described above. Therefore, the description thereof is omitted.

The organic solvent acts as a dispersion medium of the metal oxide particles, a solvent for the organic polymer compound containing an organic ligand which is bonded to a molecular chain through a covalent bond and has an ability to form a coordinate bond with metal atoms on the surface of the metal oxide particles, and/or a solvent of the monomer or oligomer for forming an organic polymer compound containing an organic ligand. However, effects of the solvent are not limited to the above and also include an effect of imparting characteristics suitable for the ink to be used, such as ink viscosity or thixotropy. In addition, drying properties for preventing bleeding or deformation of printed pattern, affinity with a printed matter, or the like also needs to be taken into consideration. Therefore, it is preferable to determine the type and amount of the organic solvent, in consideration of various conditions as above.

The ink of the present embodiment can bring about the same operation and effects as those of the organic-inorganic composite composition of the present embodiment. Moreover, if the ink is printed by a printing machine or ejected by the ink jet method to form a pattern or to be molded, it is possible to easily prepare an organic-inorganic composite having a desired shape.

EXAMPLE

Hereinafter, the present invention will be described in detail based on Examples and Comparative Examples, but the present invention is not limited to these examples.

Organic ligand-containing monomers, copolymers thereof, and surface-treated zirconium oxide particles used in Examples and Comparative Examples were prepared as follows.

[Preparation of Organic Ligand Containing Monomer and Copolymer Thereof-1]

(Example of Organic Ligand Containing Phenolic Hydroxyl Group and Heterocyclic Ring Having Nitrogen Atom as Heteroatom)

5.84 g of 8-quinolinol, 70 mL of concentrated hydrochloric acid, and 6.4 mL of 37% formaldehyde were put into a 250 mL three-neck flask equipped with a stirrer chip and reacted for 10 hours. Thereafter, the precipitated yellow crystals were filtered through a filter and washed with a large amount of acetone. Subsequently, the crystals were vacuum-dried in vacuum for 12 hours at 40° C., thereby obtaining 5-chloromethyl-8-quinolinol hydrochloride. The yield of the hydrochloride was 92%.

Thereafter, 20 g of 2-hydroxyethyl methacrylate, 0.20 g of p-methoxyphenol, and 1.78 g of sodium acetate were put into a 500 mL three-neck flask equipped with a stirrer chip, and the mixture was kept at 50° C. for 1.5 hours. Subsequently, 5.0 g of the 5-chloromethyl-8-quinolinol hydrochloride was added thereto, and the mixture was reacted for 2 hours at 90° C. After being cooled to room temperature, it was provided in ice water and neutralized with aqueous ammonia. Next, the precipitated crystals were washed with ice water, collected using a filter, and recrystallized with petroleum ether, thereby obtaining 5.2 g of 5-methyl(2-methacryloylethyloxy)-8-quinolinol (organic ligand-containing monomer).

The obtained organic ligand-containing monomer was then measured by $^1$H-NMR using deuterated chloroform, and as a result, peaks of 8.78 to 7.08 ppm (Ph-H), 6.03 ppm (=CH$_2$), 5.52 ppm (=CH$_2$), 4.87 ppm (—CH$_2$-Ph), 4.27 ppm, 3.69 ppm (—CH$_2$—O), and 1.88 (—CH$_3$) were observed. From this result, it was confirmed that the target organic ligand-containing monomer was isolated.

Subsequently, 25 mL of toluene, 5.0 g (50 mmol) of methyl methacrylate, 0.29 g (1 mmol) of the above 5-methyl (2-methacryloylethyloxy)-8-quinolinol (organic ligand-containing monomer), and 0.083 g (0.51 mmol) of 2,2'-azobisisobutyronitrile were put into a 50 mL two-neck eggplant-shaped flask equipped with a stirrer chip, and the mixture was subjected to a polymerization reaction by being stirred at 60° C. for 40 hours in a nitrogen atmosphere.

After being cooled to room temperature, the reaction solution was poured into methanol, thereby obtaining a copolymer as a precipitate. Thereafter, the solvent was removed by an evaporator, and the precipitate was vacuum-dried, thereby obtaining 4.8 g of an organic ligand-containing copolymer A.

The average molecular weight of the organic ligand-containing copolymer A that was confirmed from the result of GPC measurement was 20,000 in terms of a number average molecular weight (Mn) and 45,000 in terms of a weight average molecular weight (Mw). Moreover, the copolymer A was subjected to $^1$H-NMR measurement using deuterated chloroform to compare methyl protons in methyl methacrylate with protons in the heterocyclic ring of 8-quinolinol in terms of the peak intensity. As a result, a ratio between methyl methacrylate and 5-methyl(2-methacryloylethyloxy)-8-quinolinol was 50 mol:1 mol. From this result, it was confirmed that the organic ligand-containing copolymer A was formed at the same ratio as the input ratio.

[Preparation of Organic Ligand Containing Monomer and Copolymer Thereof-2]

(Example of Organic Ligand Having β-Diketone Structure)

10 g of 4-hydroxybenzoate, 200 mL of cyclohexanone, 5.50 g of potassium iodide, and 18.1 g of potassium carbonate were put into a 250 mL three-neck flask equipped with a stirrer chip and were dissolved by stirring in a nitrogen atmosphere. 12 mL of 2-chloroethanol was then added dropwise thereto using a syringe, and the mixture was reacted for 1 day at 120° C.

Thereafter, the reaction solution obtained after precipitates were filtered through a filter was dried, thereby obtaining an oil-like product. This product was purified using silica-gel column chromatography, thereby obtaining 4-(2-hydroxyethoxy)benzoic acid methyl ester. The yield was 85%.

Subsequently, 10 mL of tetrahydrofuran (THF) and 2.40 g of 60% NaH were put into a 50 mL two-neck flask equipped with a stirrer chip, and a solution obtained by dissolving 4.60 g of 4'-methoxyacetophenone in 6 mL of THF was added dropwise thereto. The temperature thereof was then increased to 40° C., and a solution obtained by dissolving 7.06 g of 4-(2-hydroxyethoxy)benzoic acid methyl ester in 11 mL of THF was added dropwise thereto. After the dropwise addition ended, the temperature thereof was increased to 60° C., and the mixture was reacted for 10 hours.

After the reaction ended, the mixture was cooled to 40° C., 30 mL of water and 20 mL of toluene were added thereto, pH thereof was adjusted to around 3 by using sulfuric acid, and then the bottom layer liquid was separated. Thereafter, a toluene layer as the upper layer was washed with 5 mL of water, and this toluene layer was then concentrated using an evaporator and recrystallized using 2-propanol (IPA), thereby obtaining 4-methoxy-4'-(2-hydroxyethoxy)dibenzoylmethane as white crystals. The yield was 35%.

Thereafter, 45 mL of toluene, 4.72 g of 4-methoxy-4'-(2-hydroxyethoxy)dibenzoylmethane, 0.09 g of hydroquinone, 1.59 g of methacrylic acid, and 0.27 g of p-toluenesulfonic acid monohydrate were put into a 100 mL two-neck flask equipped with a stirrer chip and a Dean-Stark apparatus (a moisture evaporator). The temperature thereof was then increased to 120° C., and the mixture was reacted for 24 hours at this temperature under reflux while the generated water was being removed by evaporation. After the reaction ended, the mixture was cooled to 50° C., and 15 ml of water was added thereto. Subsequently, pH thereof was adjusted to around 5 using an aqueous sodium hydroxide solution, and the bottom layer liquid was separated. The toluene layer as the upper layer was washed with 5 mL of water and then concentrated using an evaporator, followed by recrystallization by using IPA, thereby obtaining 4-methoxy-4'-methacryloyloxyethoxydibenzoylmethane (organic ligand-containing monomer) as white crystals. The yield was 33%.

The obtained organic ligand-containing monomer was then measured by $^1$H-NMR using deuterated chloroform. As a result, peaks of 8.02 to 6.95 ppm (Ph-H), 6.73 ppm (—CH$_2$—), 6.15 ppm, 5.61 ppm (=CH$_2$), 4.54 ppm, 4.30 ppm (—CH$_2$—O), 3.89 ppm (—O—CH$_3$), and 1.96

(—CH$_3$) were observed. From this result, it was confirmed that a target organic ligand-containing monomer was isolated.

Subsequently, 25 mL of toluene, 5.0 g (50 mmol) of methyl methacrylate, 0.39 g (1 mmol) of the above 4-methoxy-4'-methacryloyloxyethoxydibenzoylmethane (organic ligand-containing monomer), and 0.083 g (0.51 mmol) of 2,2'-azobisisobutyronitrile were put into a 50 mL two-neck eggplant-shaped flask equipped with a stirrer chip, and the mixture was subjected to a polymerization reaction by being stirred at 60° C. for 40 hours in a nitrogen atmosphere.

After being cooled to room temperature, the reaction solution was poured into methanol, and a copolymer was obtained as a precipitate. Thereafter, the solvent was removed by an evaporator, and the precipitate was vacuum-dried, thereby obtaining 4.5 g of a organic ligand-containing copolymer B.

The average molecular weight of the organic ligand-containing copolymer B that was confirmed from the result of GPC measurement was 21,000 in terms of a number average molecular weight (Mn) and 41,000 in terms of a weight average molecular weight (Mw). Moreover, the copolymer B was subjected to $^1$H-NMR measurement using deuterated chloroform to compare methyl protons in methyl methacrylate with protons in the aromatic ring of 4-methoxybenzoylmethane in terms of the peak intensity. As a result, a ratio between methyl methacrylate and 4-methoxy-4'-methacryloyloxyethoxydibenzoylmethane was 50 mol:1 mol. From this result, it was confirmed that the organic ligand-containing copolymer B was formed at the same ratio as the input ratio.

[Preparation of Surface-Treated Zirconium Oxide Particles]

100 g of water as a dispersion medium, 100 g of methanol, and 3.0 g of acetic acid as a surface treating agent were added to and mixed with 10 g of zirconium oxide particles (tetragonal type, average particle diameter of 3 nm), and then dispersion treatment was performed on the mixture by using a bead mill using zirconia beads having a diameter of 0.1 mm, thereby performing surface treatment on the zirconium oxide particles.

Subsequently, the solvent was removed from the solution by using an evaporator, thereby obtaining surface-treated zirconium oxide particles A. The surface-treated amount of the surface-treated zirconium oxide particles A that was calculated from the mass loss of organic components analyzed by thermogravimetric analysis (TGA) was 20% by mass based on the total mass of the oxide particles and the surface treating agent.

[Preparation of Green Light-Emitting Organic-Inorganic Composite Composition X]

62 mg of the surface-treated zirconium oxide particles A were added to 4 mL of ethylene glycol monoethyl ether (ethyl cellosolve), followed by stirring and mixing to prepare a transparent dispersion. Thereafter, 200 mg of the organic ligand-containing copolymer A was added thereto, followed by stirring for 3 hours at room temperature.

When the organic ligand-containing copolymer A was added and stirred, the hue of the transparent dispersion turned into yellow. From this result, it was visually confirmed that zirconium atoms of the zirconium oxide particles A and the organic ligand of the organic ligand-containing copolymer A formed a complex.

A dispersion particle diameter of the zirconium oxide particles A was measured by a dynamic scattering (DLS) method. As a result, while a dispersion particle diameter of the surface-treated zirconium oxide particles A was 3 nm in the ethylene glycol monoethyl ether dispersion, a dispersion particle diameter of the zirconium oxide particles A that was measured after the organic ligand-containing copolymer A was added increased to 15 nm. From this result, it was confirmed that the organic ligand of the organic ligand-containing copolymer A formed a coordinate bond with zirconium atoms of the zirconium oxide particles, whereby an aggregate containing plural organic ligand-containing copolymers A and plural zirconium oxide particles was formed.

In addition, after the organic solvent was removed from the organic-inorganic composite composition, the obtained organic-inorganic composite was measured by Fourier Transform Infrared Spectroscopy (FT-IR). As a result, absorption peaks that are typically seen when 8-quinolinol forms bidentate ligands on the surface of zirconium oxide particles were observed at 1577 cm$^{-1}$, 1500 cm$^{-1}$, 1470 cm$^{-1}$, 1380 cm$^{-1}$, 1321 cm$^{-1}$, 1277 cm$^{-1}$, and 1107 cm$^{-1}$.

From this result, it was confirmed that a green light-emitting organic-inorganic composite composition X was obtained.

[Preparation of Blue Light-Emitting Organic-Inorganic Composite Composition Y]

62 mg of the surface-treated zirconium oxide particles A were added to 4 mL of ethylene glycol monoethyl ether (ethyl cellosolve), followed by stirring and mixing to prepare a transparent dispersion. Thereafter, 200 mg of the organic ligand-containing copolymer B was added thereto, followed by stirring for 5 hours at room temperature.

When the organic ligand-containing copolymer B was added and stirred, the hue of the transparent dispersion turned into yellow. From this result, it was visually confirmed that the zirconium oxide particles A and the organic ligand of the organic ligand-containing copolymer B formed a complex.

A dispersion particle diameter of the zirconium oxide particles A was measured by a dynamic scattering (DLS) method. As a result, while a dispersion particle diameter of the surface-treated zirconium oxide particles A was 3 nm in the ethylene glycol monoethyl ether dispersion, a dispersion particle diameter of the zirconium oxide particles A that was measured after the organic ligand-containing copolymer B was added increased to 12 nm. From this result, it was confirmed that the organic ligand of the organic ligand-containing copolymer B formed a coordinate bond with zirconium atoms of the zirconium oxide particles, whereby an aggregate containing plural organic ligand-containing copolymers B and plural zirconium oxide particles was formed.

In addition, after the organic solvent was removed from the organic-inorganic composite composition, the obtained organic-inorganic composite was measured by Fourier Transform Infrared Spectroscopy (FT-IR). As a result, absorption peaks that are typically seen when 4-methoxybenzoylmethane forms bidentate ligands on the surface of zirconium oxide particles were observed at 1590 cm$^{-1}$, 1530 cm$^{-1}$, and 1415 cm$^{-1}$.

From this result, it was confirmed that a blue light-emitting organic-inorganic composite composition Y was obtained.

Example 1

2.0 g of the green light-emitting organic-inorganic composite composition X and 1.0 g of the blue light-emitting organic-inorganic composite composition Y were weighed, mixed with each other, and stirred, thereby obtaining an organic-inorganic composite composition of Example 1.

Thereafter, the organic-inorganic composite composition was filled in a Teflon (registered trademark) container and then dried at 120° C., thereby obtaining an organic-inorganic composite of Example 1.

The organic-inorganic composite was measured by Fourier Transform Infrared Spectroscopy (FT-IR), and as a result, an absorption peak that is typically seen when 8-quinolinol and 4-methoxybenzoylmethane form bidentate ligands on the surface of zirconium oxide particles was confirmed. From this result, it was confirmed that the organic-inorganic composite composition and organic-inorganic composite of the present invention were obtained.

Example 2

An organic-inorganic composite composition and an organic-inorganic composite of Example 2 were obtained in the same manner as in Example 1, except that 1.5 g of the green light-emitting organic-inorganic composite composition X and 1.5 g of the blue light-emitting organic-inorganic composite composition Y were used.

The organic-inorganic composite was measured by FT-IR, and as a result, the absorption peak similar to that of the organic-inorganic composite of Example 1 was observed. From this result, it was confirmed that the organic-inorganic composite composition and organic-inorganic composite of the present invention were obtained.

Example 3

An organic-inorganic composite composition and an organic-inorganic composite of Example 3 were obtained in the same manner as in Example 1, except that 1.0 g of the green light-emitting organic-inorganic composite composition X and 2.0 g of the blue light-emitting organic-inorganic composite composition Y were used.

The organic-inorganic composite was measured by FT-IR, and as a result, the absorption peak similar to that of the organic-inorganic composite of Example 1 was observed. From this result, it was confirmed that the organic-inorganic composite composition and organic-inorganic composite of the present invention were obtained.

Example 4 (Production of Ink Composition)

2 mL of α-terpineol was added to the organic-inorganic composite composition of Example 2, and the viscosity thereof was adjusted to be 20,000 cP by using ethyl cellulose (100 cP), thereby obtaining an ink composition for printing of Example 4.

It was visually confirmed that the hue of the ink composition for printing was pale yellow, and the zirconium oxide particles A and the organic ligand of the organic ligand-containing copolymer A formed a complex.

The ink composition for printing was used for screen printing to form a solid film, and then the film was dried at 120° C., thereby forming a printing film having a thickness of 20 μm.

The printing film was measured by FT-IR, and as a result, the absorption peak similar to that of the organic-inorganic composite of Example 1 was observed. From this result, it was confirmed that the film was the ink composition for printing of the present invention.

Example 5 (Production of Ink Composition)

25 mL of ethylene glycol momoethyl ether (ethyl cellosolve), 2.8 g (40 mmol) of acrylamide, 1.0 g (10 mmol) of methyl methacrylate, 0.29 g (1 mmol) of 5-methyl(2-methacryloylethyloxy)-8-quinolinol (organic ligand-containing monomer), and 0.083 g (0.51 mmol) of 2,2'-azobisisobutyronitrile were put into a 50 mL two-neck eggplant-shaped flask equipped with a stirrer chip, and the mixture was subjected to a polymerization reaction by being stirred at 60° C. for 40 hours in a nitrogen atmosphere.

After being cooled to room temperature, the reaction solution was poured into hexane, thereby obtaining a copolymer as a precipitate. Thereafter, the solvent was removed by an evaporator, and the precipitate was vacuum-dried, thereby obtaining 4.2 g of an organic ligand-containing copolymer A'.

The average molecular weight of the organic ligand-containing copolymer A' that was confirmed from the result of GPC measurement was 19,000 in terms of a number average molecular weight (Mn) and 39,000 in terms of a weight average molecular weight (Mw). Moreover, the copolymer A' was subjected to $^1$H-NMR measurement using deuterated chloroform to compare amide protons in acrylamide with methyl protons in the methyl methacrylate and protons in the heterocyclic ring of 8-quinolinol, in terms of the peak intensity. As a result, a ratio among acrylamide, methyl methacrylate, and 5-methyl(2-methacryloylethyloxy)-8-quinolinol was 40 mol:10 mol:1 mol. From this result, it was confirmed that the organic ligand-containing copolymer A' was formed at the same ratio as the input ratio.

Thereafter, 25 mL of ethylene glycol monoethyl ether (ethyl cellosolve), 2.8 g (40 mmol) of acrylamide, 1.0 g (10 mmol) of methyl methacrylate, 0.39 g (1 mmol) of 4-methoxy-4'-methacryloyloxyethoxydibenzoylmethane (organic ligand-containing monomer), and 0.083 g (0.51 mmol) of 2,2'-azobisisobutyronitrile were put into a 50 mL two-neck eggplant-shaped flask equipped with a stirrer chip, and the mixture was subjected to a polymerization reaction by being stirred at 60° C. for 40 hours in a nitrogen atmosphere.

After being cooled to room temperature, the reaction solution was poured into hexane, thereby obtaining a copolymer as a precipitate. Thereafter, the solvent was removed by an evaporator, and the precipitate was vacuum-dried, thereby obtaining 4.0 g of an organic ligand-containing copolymer B'.

The average molecular weight of the organic ligand-containing copolymer B' that was confirmed from the result of GPC measurement was 20,000 in terms of a number average molecular weight (Mn) and 40,000 in terms of a weight average molecular weight (Mw). Moreover, the copolymer B' was subjected to $^1$H-NMR measurement using deuterated chloroform to compare amide protons in acrylamide with methyl protons in methyl methacrylate and protons in the heterocyclic ring of 8-quinolinol in terms of the peak intensity. As a result, a ratio among acrylamide, methyl methacrylate, and 4-methoxy-4'-methacryloyloxyethoxydibenzoylmethane was 40 mol:10 mol:1 mol. From this result, it was confirmed that the organic ligand-containing copolymer B' was formed at the same ratio as the input ratio.

62 mg of the surface-treated zirconium oxide particles A were added to 2 mL of water, 1 mL of 2-propanol, and 1 mL of diethylene glycol, followed by stirring and mixing to prepare a transparent dispersion. Thereafter, 200 mg of the organic ligand-containing copolymer A' was added thereto, followed by stirring, thereby obtaining an ink composition X' for emitting green light.

Separately from the above, 62 mg of the surface-treated zirconium oxide particles A were added to 2 mL of water, 1 mL of 2-propanol, and 1 mL of diethylene glycol, followed by stirring and mixing to prepare a transparent dispersion. Thereafter, 200 mg of the organic ligand-containing copolymer B' was added thereto, followed by stirring, thereby obtaining an ink composition Y' for emitting blue light.

Subsequently, 1.5 g of the ink composition X' for emitting green light and 1.5 g of the ink composition Y' for emitting blue light were weighed, mixed with each other, and stirred, thereby obtaining an ink composition for ink jet of Example 5.

A dispersion particle diameter of the zirconium oxide particles A was measured by a dynamic light scattering method (DLS). As a result, while a dispersion particle diameter of the surface-treated zirconium oxide particles A in a water-2-propanol dispersion was 3 nm, a dispersion particle diameter of the zirconium oxide particles A that was measured after the organic ligand-containing copolymers A' and B' were added increased to 23 nm. From this result, it was confirmed that the organic ligand of each of the organic ligand-containing copolymers A' and B' respectively formed a coordinate bond with the zirconium oxide particles, whereby an aggregate containing plural organic ligand-containing copolymers A' and B', and plural zirconium oxide particles was formed. That is, it was confirmed that an ink composition for ink jet that is the ink of the present invention was formed.

Thereafter, an ink-receptive coating material formed of 90 g of polyvinyl butyral resin S-LEC BX-10 (manufactured by Sekisui Chemical Co., Ltd.) and 10 g of silica-sol was coated onto Lumirror U-94 (manufactured by Toray Industries, Inc.) which is a PET film of A4 size having a film thickness of 125 μm by using a bar coater, followed by drying, thereby obtaining a transparent substrate having an ink-receptive layer with a coating film thickness of 10 μm.

Subsequently, the ink composition for an ink jet was filled in an ink jet type printer PM-2000C (manufactured by Seiko Epson Corporation), and by using this ink composition, a film-like solid pattern was formed on the transparent film substrate having an ink-receptive layer.

The ink jet film was measured by FT-IR, and as a result, the absorption peak similar to that of the organic-inorganic composite of Example 1 was observed. From this result, it was conformed that the ink composition for ink jet that was the ink of the present invention was formed.

Comparative Example 1

25 mL of toluene, 5.0 g of methyl methacrylate, and 0.080 g of 2,2'-azobisisobutyronitrile were put into a 50 mL two-neck eggplant-shaped flask equipped with a stirrer chip, and the mixture was subjected to a polymerization reaction by being stirred at 60° C. for 30 hours in a nitrogen atmosphere. Subsequently, after being cooled to room temperature, the reaction solution was poured into methanol, thereby obtaining a polymer as a precipitate. Thereafter, the solvent in the precipitate was removed by an evaporator, and the precipitate was then vacuum-dried, thereby obtaining 4.5 g of a polymer C.

The average molecular weight of the polymer C that was confirmed from the results of GPC measurement was 16,000 in terms of a number average molecular weight (Mn) and 39,000 in terms of a weight average molecular weight (Mw).

Subsequently, 62 mg of the surface-treated zirconium oxide particles A were added to 4 mL of ethylene glycol monoethyl ether (ethyl cellosolve), followed by stirring and mixing, thereby obtaining a transparent dispersion. Thereafter, 5.3 mg of 8-quinolinol and 195 mg of the polymer C were added to the transparent dispersion, followed by stirring, thereby obtaining a green light-emitting organic-inorganic composite composition X" for comparison.

Separately from the above, 62 mg of the surface-treated zirconium oxide particles A were added to 4 mL of ethylene glycol monoethyl ether (ethyl cellosolve), followed by stirring and mixing, thereby obtaining a transparent dispersion. Thereafter, 10.5 mg of 1,3-bis(4-methoxyphenyl)-1,3-propanedione and 190 mg of the polymer C were added to the transparent dispersion, followed by stirring, thereby preparing a green light-emitting organic-inorganic composite composition Y" for comparison.

Thereafter, 2.0 g of the green light-emitting organic-inorganic composite composition X" for comparison and 1.0 g of the blue light-emitting organic-inorganic composite composition Y" for comparison were weighed, mixed with each other, and stirred, thereby obtaining an organic-inorganic composite composition of Comparative Example 1.

Subsequently, the organic-inorganic composite composition was filled in a Teflon (registered trademark) container and then dried at 120° C., thereby preparing an organic-inorganic composite for Comparative Example 1.

Thereafter, the organic-inorganic composite was measured by FT-IR, and as a result, an absorption peak that is typically seen when 8-quinolinol and 4-methoxybenzoylmethane form bidentate ligands on the surface of zirconium oxide particles was observed. From this result, it was confirmed that in the organic-inorganic composite, two kinds of ligands are bonded to the surface of zirconium oxide particles just like the present invention.

Moreover, when 8-quinolinol and 1,3-bis(4-methoxyphenyl)-1,3-propanedione were added to the organic-inorganic composite composition and stirred, the hue of the composition turned into yellow from a transparent state. From this result, it was visually confirmed that the zirconium oxide particles A, 8-quinolinol, and 1,3-bis(4-methoxyphenyl)-1, 3-propanedione formed a complex.

Meanwhile, a dispersion particle diameter of the surface-treated zirconium oxide particles A in the organic-inorganic composite composition was measured by DLS. As a result, the diameter was about 3 nm, which showed that it practically did not change compared to the diameter measured before the polymer C or the like was added.

From the above result, it was confirmed that there is no bond or interaction among 8-quinolinol coordinated onto the surface of the zirconium oxide particles A, 1,3-bis(4-methoxyphenyl)-1,3-propanedione, and the polymer C, and accordingly, there is no bond or interaction between the organic ligand and the polymer chain of the organic polymer compound, and the organic ligand is coordinated alone onto the surface of the zirconium oxide particles A.

Comparative Example 2

An organic-inorganic composite composition and an organic-inorganic composite of Comparative Example 2 were obtained in the same manner as in Comparative Example 1, except that 1.5 g of the green light-emitting organic-inorganic composite composition X" for comparison and 1.5 g of the blue light-emitting organic-inorganic composite composition Y" for comparison were used.

Comparative Example 3

An organic-inorganic composite composition and an organic-inorganic composite of Comparative Example 3 were obtained in the same manner as in Comparative Example 1, except that 1.0 g of the green light-emitting organic-inorganic composite composition X" for comparison and 2.0 g of the blue light-emitting organic-inorganic composite composition Y" for comparison were used.

Comparative Example 4 (Production of Ink Composition)

2 mL of α-terpineol was added to the organic-inorganic composite composition of Comparative Example 2, and the viscosity thereof was adjusted to be 20,000 cP by using ethyl cellulose (100 cP), thereby obtaining an ink composition for printing of Comparative Example 4.

It was visually confirmed that the hue of the ink composition for printing was pale yellow, and the zirconium oxide particles A, 8-quinolinol, and 1,3-bis(4-methoxyphenyl)-1, 3-propanedione formed a complex.

Meanwhile, the ink composition for printing was observed using a transmission electron microscope (TEM). As a result, a dispersion particle diameter of the surface-treated zirconium oxide particles A was about 3 nm which showed that it practically did not change compared to the diameter measured before the polymer C or the like was added.

From the above result, it was confirmed that there is no bond or interaction among 8-quinolinol coordinated onto the surface of the zirconium oxide particles A, 1,3-bis(4-methoxyphenyl)-1,3-propanedione, and the polymer C, and accordingly, there is no bond or interaction between the organic ligand and the polymer chain of the organic polymer compound, and the organic ligand is coordinated alone onto the surface of the zirconium oxide particles A.

The ink composition for printing was used for screen printing to form a solid film, and then the film was dried at 120° C., thereby forming a printing film having a thickness of 20 μm.

[Evaluation]

Each of the organic-inorganic composites, printing films, and ink jet films obtained in Examples 1 to 5 and Comparative Examples 1 to 4 was evaluated in terms of visible light transmittance, absorbance, a maximum value of light emission wavelength, and stability of light emission wavelength by the following method.

Herein, for comparison, an organic-inorganic composite in which an aggregate of zirconium oxide particles and the organic ligand-containing copolymer A was formed was taken as a standard 1, and an organic-inorganic composite in which an aggregated of zirconium oxide particles and the organic ligand-containing copolymer B was formed was taken as a standard 2.

In addition, the organic-inorganic composite as the standard 1 was obtained by drying the green light-emitting organic-inorganic composite composition X, and the organic-inorganic composite as the standard 2 was obtained by drying the blue light-emitting organic-inorganic composite composition Y. The organic-inorganic composites as the standards 1 and 2 have only one kind of light emission site and are not included in the scope of the organic-inorganic composite of the invention of the present application.

(1) Visible Light Transmittance

Visible light transmittance was measured in a wavelength range of 350 nm to 800 nm by using a spectrophotometer V-570 (manufactured by JASCO Corporation).

Herein, the above organic-inorganic composites were made into films having a thickness of about 20 μm, and visible light transmittance was measured by setting a transmittance of a quartz substrate to 100%.

For the evaluation, if the visible light transmittance was 85% or higher, it was determined to be "○" (excellent), and if it was lower than 85%, it was determined to be "X" (defective).

(2) Absorbance

A UV-visible absorption spectrum was measured using a UV-visible spectrophotometer (manufactured by Shimadzu Corporation), and an absorption wavelength (nm) was determined from the UV-visible absorption spectrum.

(3) Maximum Value of Light Emission Wavelength

Figure 4:
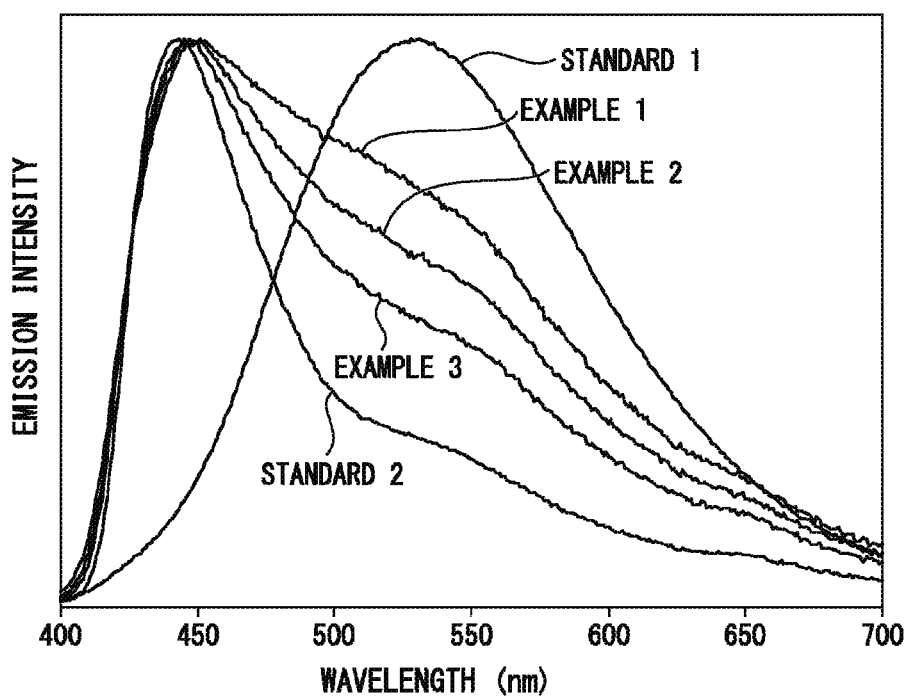
FIG. 4 is a view showing emission spectra of Examples 1 to 3 and Standards 1 and 2 of the present invention respectively.
Figure 5:
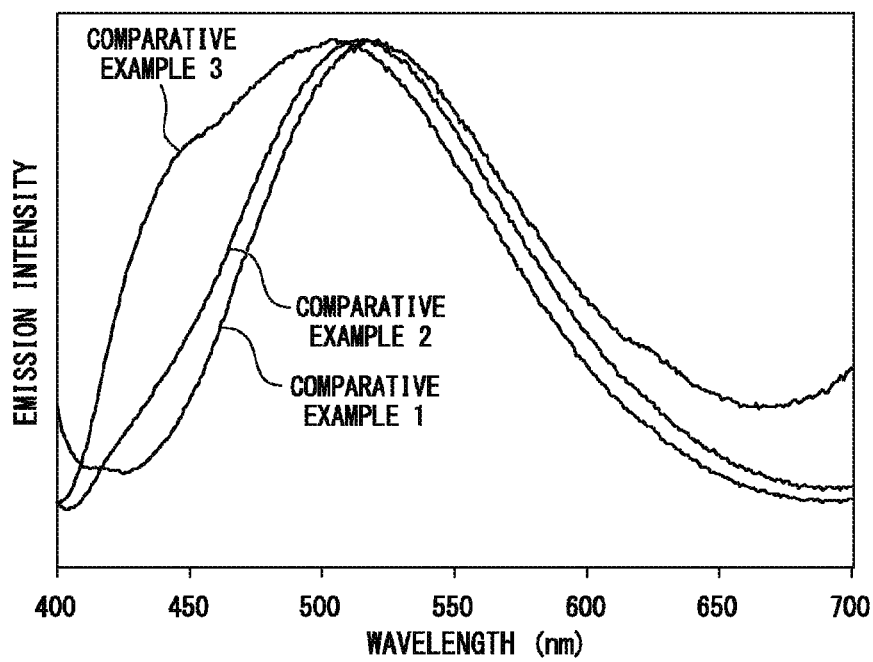
FIG. 5 is a view showing emission spectra of Comparative Examples 1 to 3 respectively.

The organic-inorganic composites were excited with the wavelength at which absorption was observed in UV-visible absorption spectrum, and a maximum value of the light emission wavelength thereof was measured using a fluorescence spectrophotometer (manufactured by Horiba, Ltd.). The results of the measured light emission spectrum are shown in FIGS. 4 and 5.

(4) CIE Values and Chromaticity Curve by CIE Diagram

The organic-inorganic composites were excited with the wavelength at which absorption was observed in UV-visible absorption spectrum, and emission colors of the above composites were measured using a fluorescence spectrophotometer (manufactured by Horiba, Ltd.) to determine CIE values.

Figure 6:
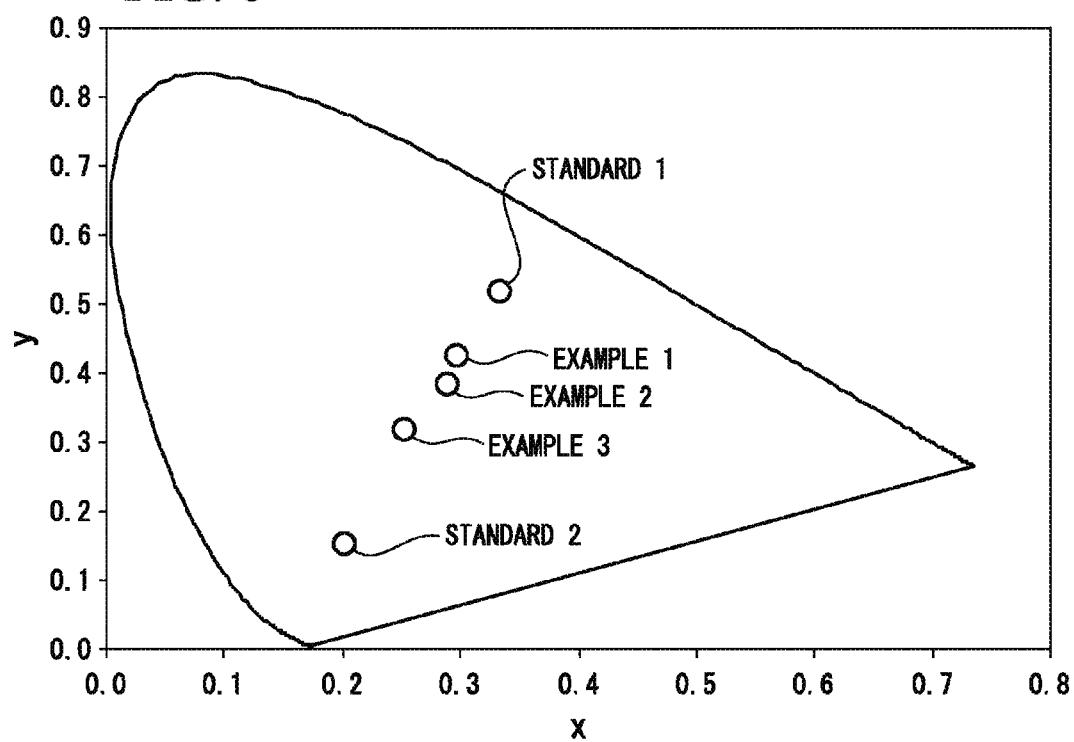
FIG. 6 is a view showing the results obtained when the emission colors in Examples 1 to 3 and Standards 1 and 2 of the present invention are respectively indicated in a chromaticity curve of a CIE diagram.

FIG. 6 shows the results obtained when emission colors of each of Examples 1 to 3 and Standards 1 and 2 are indicated on the chromaticity curve of CIE diagram.

(5) Stability of Light Emission Wavelength

By using a fluorescence spectrophotometer (manufactured by Horiba, Ltd.), the maximum value of light emission wavelength of the organic-inorganic composites was measured immediately after the composites were prepared and after 1 week elapsed from the preparation, thereby evaluating the stability of the light emission wavelength.

Herein, if decrease in the maximum value of light emission wavelength that was measured after 1 week elapsed from the preparation was less than 20% of the maximum value of light emission wavelength measured immediately after the preparation, it was determined to be "○" (excellent), and if the decrease was 20% or more, it was determined to be "X" (defective).

Tables 1 and 2 show the results.

TABLE 1

|  | Metal oxide particles | Organic compound | Visible light transmittance | Absorbance (nm) | CIE | Stability of light emission wavelength |
|---|---|---|---|---|---|---|
| Example 1 | Zirconium oxide | Copolymer A + Copolymer B | ○ | 385 | (0.297, 0.423) | ○ |
| Example 2 | Zirconium oxide | Copolymer A + Copolymer B | ○ | 385 | (0.289, 0.381) | ○ |
| Example 3 | Zirconium oxide | Copolymer A + Copolymer B | ○ | 385 | (0.253, 0.316) | ○ |

TABLE 1-continued

|  | Metal oxide particles | Organic compound | Visible light transmittance | Absorbance (nm) | CIE | Stability of light emission wavelength |
|---|---|---|---|---|---|---|
| Standard 1 | Zirconium oxide | Copolymer A | ○ | 385 | (0.334, 0.519) | ○ |
| Standard 2 | Zirconium oxide | Copolymer B | ○ | 379 | (0.202, 0.153) | ○ |
| Comparative Example 1 | Zirconium oxide | Polymer C + 8-quinolinol + 1,3-bis(4-methoxyphenyl)-1,3-propanedione | X | 388 | (0.327, 0.502) | X |
| Comparative Example 2 | Zirconium oxide | Polymer C + 8-quinolinol + 1,3-bis(4-methoxyphenyl)-1,3-propanedione | X | 388 | (0.310, 0.487) | X |
| Comparative Example 3 | Zirconium oxide | Polymer C + 8-quinolinol + 1,3-bis(4-methoxyphenyl)-1,3-propanedione | X | 388 | (0.285, 0.418) | X |

From Table 1, it was found that the organic-inorganic composites of Examples 1 to 3 are better in both the visible light transmittance and stability of light emission wavelength, compared to the organic-inorganic composites of Comparative Examples 1 to 3, and improved in terms of the light emission characteristics and transparency.

In addition, as shown in FIG. 6, from the CIE chromaticity curve, it was found that if the organic-inorganic composite compositions respectively emitting light of blue and green are mixed with each other at any ratio for the organic-inorganic composites of Examples 1 to 3, it is possible to consecutively and easily adjust the emission color of the organic-inorganic composite, from blue to green.

Moreover, from the light emission spectrum shown in FIG. 4, it was found that all of the organic-inorganic composites of Examples 1 to 3 have the light emission wavelengths, which are obtained from the Standards 1 and 2 which are the organic-inorganic composites obtained respectively from organic-inorganic composite compositions having not been mixed, and the ratio between light emission strengths of both the light emission wavelengths is proportional to the mixing ration between two of the organic-inorganic composite compositions.

From the above results, it was clearly found that energy shift from blue emission color to green emission color is inhibited, and the light emission sites are effectively combined with each other while being present independently. It was understood that for this reason, a homogeneous organic-inorganic composite which can adjust the emission color while maintaining transparency can be provided.

Meanwhile, in the organic-inorganic composites of Comparative Examples 1 to 3, zirconium oxide particles which had formed a complex were aggregated since the particles were not fixed to the organic polymer, and accordingly, transparent composites were not obtained. In addition, since the organic ligand did not have a bond with the polymer, the blue light emission site and green light emission site in the obtained organic-inorganic composite became close to each other due to aggregation, and this easily caused energy shift. From these results, it was understood that the emission color is not easily adjusted simply by mixing, and fluorescence intensity decreases markedly due to the passage of time. These facts are also clearly confirmed from FIG. 5.

TABLE 2

|  | Type of ink | Metal oxide particles | Organic compound | Visible light transmittance | Absorbance (nm) | CIE | Stability of light emission wavelength |
|---|---|---|---|---|---|---|---|
| Example 4 | Printing ink | Zirconium oxide | Copolymer A + Copolymer B | ○ | 385 | (0.280, 0.380) | ○ |
| Example 5 | Ink jet ink | Zirconium oxide | Copolymer A' + Copolymer B' | ○ | 385 | (0.287, 0.378) | ○ |
| Comparative Example 4 | Printing ink | Zirconium oxide | Copolymer A | X | 388 | (0.319, 0.488) | X |

From Table 2, it was found that the film obtained from the ink for printing and ink jet ink of Examples 4 and 5 are excellent in both the visible light transmittance and stability of light transmission wavelength compared to the film obtained from the ink for printing of Comparative Example 4 and improved in terms of light emission characteristics and transparency.

In addition, as the CIE values described in Tables 1 and 2 were close to each other, the hue of the organic-inorganic composite of Example 2 was practically the same as the hue of the films obtained in Examples 4 and 5. From these results, it was understood that even in the ink for printing and ink jet ink, if organic-inorganic composite compositions respectively emitting light of blue and green are mixed with each other at any ratio, it is possible to consecutively and easily adjust the emission color of the organic-inorganic composite as the obtained film, from blue to green. It was understood that for this reason, a homogeneous ink for printing and ink jet ink which can adjust the emission color while maintaining transparency can be provided.

On the other hand, in the ink for printing of Comparative Example 4, zirconium oxide particles were not fixed to the organic polymer, and accordingly, the zirconium oxide particles that had formed a complex were aggregated. As a result, a transparent printing film was not obtained. Moreover, it was found that since the organic ligand did not have a bond with the polymer, the printing film was poorly resistant to light and heat, and fluorescence intensity decreases markedly due to the passage of time. Furthermore, it was impossible to realize a target emission color.

INDUSTRIAL APPLICABILITY

The organic-inorganic composite of the present invention forms a complex by using metal atoms on the surface of metal oxide particles. Accordingly, when two or more emission colors are mixed with each other, it is possible to maintain each of the emission colors while maintaining light emission characteristics and transparency thereof. In addition, the organic-inorganic composite of the present invention is a composite that can improve light emission characteristics and transparency thereof. Therefore, the composite is applicable to various light emitting elements or members that are required to have high accuracy and reliability, such as a light emitting device or display using a light emitting element, a light emitting element of an organic EL device, an optical information recording medium such as an optical film, a MO, a CD, and a DVD, an anti-counterfeiting ink, a fluorescent ink for marking, a fluorescent ink for a bar code, an ink for printing, and an ink jet ink, and brings about great industrial effects.

The present invention provides an organic-inorganic composite, an organic-inorganic composite composition, and an ink containing the organic-inorganic composite composition. In the present invention, a complex is formed by using metal atoms on the surface of metal oxide particles. Accordingly, even when there are plural kinds of such complexes, each of light rays obtained according to the type of complexes can independently maintain and retain its own emission color, without negatively affecting each other or affecting each other to a lesser degree.

BRIEF DESCRIPTION OF REFERENCE SYMBOLS 1, 1', 1" organic-inorganic composite
2, 2', 2" metal oxide particles
3, 3', 3" organic polymer compound
4, 4', 4" polymer chain
4a organic ligand-containing monomer
4b vinyl-based monomer
5, 5', 5", 5''' organic ligand
6, 6', 6", 6''' complex

We claim:

1. An organic-inorganic composite having two or more kinds of light emission sites, wherein the light emission sites are complexes, and the organic-inorganic composite comprises:
    metal oxide particles; and
    an organic polymer compound having a polymer chain and an organic ligand which is bonded to the polymer chain through a covalent bond,
    wherein the organic polymer compound is bonded to the metal oxide particles in a manner in which the organic ligand forms a complex with metal atoms on the surface of the metal oxide particles;
    wherein when the organic-inorganic composite is caused to emit light, each of emission colors in each of light emission sites is independently maintained as a emission color that is shown when each of the light emission sites is independently caused to emit light;
    wherein the organic-inorganic composite satisfies at least one of the following (i) to (iv), (i) the organic polymer compound comprises two or more kinds of the organic ligand to form two or more kinds of complexes which are light emission sites;
    (ii) the organic-inorganic composite comprises two or more kinds of organic-inorganic composites wherein the organic-inorganic composites have different complexes having different emission colors, and wherein the complexes have different organic ligands or metal oxide particles from each other, or have different organic ligands and metal oxide particles from each other;
    (iii) the organic-inorganic composite comprises two or more kinds of the metal oxide particles to form two or more kinds of complexes which are light emission sites; and
    (iv) the organic-inorganic composite comprises composite metal oxide particles which have two or more kinds of metal atoms as the metal oxide particles to form two or more kinds of complexes which are light emission sites; and
    wherein the organic ligand is generated from at least one selected from (i) an organic compound which contains a phenolic hydroxyl group and a heterocyclic ring having a nitrogen atom as a heteroatom and forms a complex by using the hydroxyl group and the nitrogen, (ii) an organic compound which contains a phenolic hydroxyl group and a carbonyl group and forms a complex by using the groups, and (iii) an organic compound which has a β-diketone structure and forms a complex by using the structure.

2. The organic-inorganic composite according to claim 1, wherein the two or more kinds of complexes which are light emission sites are separated from each other with an interval therebetween that is equal to or longer than a single-nanometer order.

3. The organic-inorganic composite according to claim 1, wherein the organic polymer compound forms an inorganic dispersed phase by being crosslinked by the metal oxide particles.

4. The organic-inorganic composite according to claim 1, wherein the light emission site is a complex formed of the organic ligand and the metal atoms.

5. An organic-inorganic composite composition, which generates the organic-inorganic composite according to claim 1, the organic-inorganic composite composition comprising:
    metal oxide particles; and
    (i) an organic polymer compound having an organic ligand which is bonded to a polymer chain thereof through a covalent bond and has an ability to form a coordinate bond with metal atoms on the surface of the metal oxide particles; or
    (ii) a monomer or oligomer forming an organic polymer compound having an organic ligand, which has an ability to form a coordinate bond with metal atoms on the surface of the metal oxide particles,
    wherein at least one of (a) and (b) is satisfied:
    (a) the composite composition includes two or more kinds of the metal oxide particles, and/or the metal oxide particles are composite metal oxide particles having two or more kinds of metal atoms; and
    (b) the organic polymer compound has two or more kinds of the organic ligand, the composite composition includes two or more kinds of the organic polymer compound which have different organic ligands, or the composite composition includes two or more kinds of the monomer or oligomer; and wherein the organic ligand is generated from at least one selected from (i) an organic compound containing a phenolic hydroxyl group and a heterocyclic ring having a nitrogen atom as a heteroatom and forming a complex including the hydroxyl group and the nitrogen, (ii) an organic compound containing a phenolic hydroxyl group and a carbonyl group and forming a complex including these groups, and (iii) an organic compound having a β-diketone structure and forming a complex including that structure.

6. An ink comprising:
the organic-inorganic composite composition according to claim 5; and
an organic solvent.

7. A method for producing an organic-inorganic composite according to claim 1, comprising:
a first step of obtaining an organic-inorganic composite composition by mixing metal oxide particles with (i) an organic polymer compound having an organic ligand which is bonded to a polymer chain thereof through a covalent bond and has an ability to form a coordinate bond with metal atoms on the surface of the metal oxide particles and/or (ii) a monomer or oligomer forming an organic polymer compound having an organic ligand which has an ability to form a coordinate bond with metal atoms on the surface of the metal oxide particles; and
a second step of obtaining the organic-inorganic composite by curing the obtained organic-inorganic composite composition,
wherein, in the first step,
(a) two or more kinds of the metal oxide particles are used, and/or composite metal oxide particles which have two or more kinds of metal atoms are used as the metal oxide particles; and/or
(b) the organic polymer compound has two or more kinds of the organic ligand; two or more kinds of the organic polymer compound are used which have different organic ligand are used; or
two or more kinds of the monomer or oligomer are used, and
wherein the organic-inorganic composite composition generated in the first step satisfies at least one of:
(a') the organic-inorganic composite composition includes two or more kinds of the metal oxide particles;
(b') the metal oxide particles are composite metal oxide particles which have two or more kinds of metal atoms;
(c') the organic polymer compound has two or more kinds of the organic ligand;
(d') the organic-inorganic composite composition includes two or more kinds of the organic polymer compound which have different organic ligand from each other, and
(e') the composite composition includes two or more kinds of the monomer or oligomer; and
wherein the organic ligand is generated from at least one selected from (i) an organic compound containing a phenolic hydroxyl group and a heterocyclic ring having a nitrogen atom as a heteroatom and forming a complex including the hydroxyl group and the nitrogen, (ii) an organic compound containing a phenolic hydroxyl group and a carbonyl group and forming a complex including these groups, and (iii) an organic compound having a β-diketone structure and forming a complex including that structure.

8. The method for producing an organic-inorganic composite according to claim 7, wherein the organic-inorganic composite is a mixture which includes two or more kinds of organic-inorganic composites having different emission colors.

9. The method for producing an organic-inorganic composite according to claim 7, wherein the organic polymer compound forms an inorganic dispersed phase by being crosslinked by the metal oxide particles.

10. The method for producing an organic-inorganic composite according to claim 7, wherein the polymer chain has two or more kinds of the organic ligand to form two or more kinds of complexes which are light emission sites.

11. The method for producing an organic-inorganic composite according to claim 7, wherein
the organic-inorganic composite comprises two or more kinds of the metal oxide particles to form two or more kinds of complexes which are light emission sites, or
the organic-inorganic composite comprises composite metal oxide particles, which have two or more kinds of metal atoms, as the metal oxide particles to form two or more kinds of complexes which are light emission sites.

12. The organic-inorganic composite according to claim 1, wherein
the organic ligand has a cyclic structure which is a conjugated type bonds or has unsaturated bonds,
the ligand contains an element having a lone electron pair and a hydroxyl group in the same ligand, and
a cyclic complex is formed by the ligand wherein electrons of the lone electron pair and oxygen atoms of the hydroxyl group are coordinated with the same metal atom of the metal oxide particles.

13. The organic-inorganic composite according to claim 1, wherein
an average particle diameter of the metal oxide particles is from 1 nm to 100 nm, and
the amount of the metal oxide particles in the organic-inorganic composite is from 1% by mass to 50% by mass.

14. The method for producing an organic-inorganic composite according to claim 7, wherein the first step includes sub-steps (a)-(i) to (a)-(iii) or sub-steps (b)-(i) to (b)-(iii), wherein
(a)-(i) preparing one or more kinds of metal oxide particles and one or more kinds of an organic polymer compound having an organic ligand, which is bonded to a polymer chain thereof through a covalent bond and has an ability to form a coordinate bond with metal atoms on the surface of the metal oxide particles, wherein when one kind of the metal oxide particles is used, two or more kinds of the organic polymer compound are used, and when one kind of the organic polymer compound is used, two or more kinds of the metal oxide particles are used,
(a)-(ii) preparing two or more different mixtures by mixing the metal oxide particles and the organic polymer compound, and
(a)-(iii) mixing the different mixtures to obtain a mixture as the organic-inorganic composite composition;
(b)-(i) preparing one or more kinds of metal oxide particles and one or more kinds of a monomer or oligomer which forms an organic polymer compound having an organic ligand, wherein when one kind of the metal oxide particles is used, two or more kinds of the monomer or oligomer are used, and when one kind of the monomer or oligomer is used, two or more kinds of the metal oxide particles are used, (b)-(ii) preparing two or more different mixtures by mixing the metal oxide particles and the monomer or oligomer, and polymerizing the monomer or oligomer to prepare two or more different organic-inorganic composite compositions, and (b)-(iii) mixing the two or more different organic-inorganic composite compositions to form a mixture as the organic-inorganic composite composition.

15. The method for producing an organic-inorganic composite according to claim 7, wherein the first step includes sub-steps (a)-(i) to (a)-(ii) or sub-steps (b)-(i) to (b)-(ii), wherein (a)-(i) preparing one or more kinds of metal oxide particles and an organic polymer compound having two or more kinds of an organic ligand, and (a)-(ii) mixing the metal oxide particles and the organic polymer compound to obtain the organic-inorganic composite composition; or (b)-(i) preparing one or more kinds of metal oxide particles and one or more kinds of a monomer or oligomer which forms an organic polymer compound having two or more kinds of an organic ligand, and (b)-(ii) mixing the metal oxide particles and the monomer or oligomer to obtain the organic-inorganic composite composition.

16. The method for producing an organic-inorganic composite according to claim 7, wherein the first step includes sub-steps (a)-(i) to (a)-(ii), sub-steps (b)-(i) to (b)-(ii), sub-steps (c)-(i) to (c)-(ii), or sub-steps (d)-(i) to (d)-(ii), wherein (a)-(i) preparing two or more kinds of metal oxide particles and an organic polymer compound having one or more kinds of an organic ligand, and (a)-(ii) mixing the metal oxide particles and the organic polymer compound to obtain the organic-inorganic composite composition;

(b)-(i) preparing two or more kinds of metal oxide particles and a monomer or oligomer which forms an organic polymer compound having one or more kinds of an organic ligand, and (b)-(ii) mixing the metal oxide particles and the monomer or oligomer to obtain the organic-inorganic composite composition, (c)-(i) preparing a composite metal oxide particles which have two or more kinds of metal atoms on the surface thereof, and an organic polymer compound having one or more kinds of an organic ligand, and (c)-(ii) mixing the metal oxide particles and the organic polymer compound to obtain the organic-inorganic composite composition; or (d)-(i) preparing a composite metal oxide particles which have two or more kinds of metal atoms on the surface thereof and a monomer or oligomer which forms an organic polymer compound having one or more kinds of an organic ligand, and (d)-(ii) mixing the metal oxide particles and the monomer or oligomer to obtain the organic-inorganic composite composition.

17. The organic-inorganic composite according to claim 1, wherein the two or more kinds of complexes which are light emission sites emit different emission light.

* * * * *